US012327973B2

(12) United States Patent
Wu et al.

(10) Patent No.: US 12,327,973 B2
(45) Date of Patent: Jun. 10, 2025

(54) CONDUCTIVE COMPONENT STRUCTURE OF RAIL-TYPE TERMINAL DEVICE

(71) Applicants: SWITCHLAB, INC., New Taipei (TW); SWITCHLAB (SHANGHAI) CO., LTD., Shanghai (CN); GAOCHENG ELECTRONICS CO., LTD., Shenzhen (CN)

(72) Inventors: Chih-Yuan Wu, New Taipei (TW); Ming-Shan Tai, New Taipei (TW)

(73) Assignees: Switchlab Inc., New Taipei (TW); Switchlab (Shanghai) Co., Ltd., Taiwan Shanghai (CN); Gaocheng Electronics Co., Ltd., Shenzhen (CN)

( * ) Notice: Subject to any disclaimer, the term of this patent is extended or adjusted under 35 U.S.C. 154(b) by 400 days.

(21) Appl. No.: 17/983,977

(22) Filed: Nov. 9, 2022

(65) Prior Publication Data

US 2023/0170633 A1 Jun. 1, 2023

(30) Foreign Application Priority Data

Nov. 30, 2021 (TW) ................................ 110144696

(51) Int. Cl.

*H01R 4/00* (2006.01)
*H01R 4/48* (2006.01)
*H01R 9/22* (2006.01)
*H01R 9/26* (2006.01)
*H01R 9/24* (2006.01)

(52) U.S. Cl.
CPC ............ *H01R 9/2691* (2013.01); *H01R 4/48* (2013.01); *H01R 9/223* (2013.01); *H01R 9/2416* (2013.01)

(58) Field of Classification Search
CPC ................................ H01R 4/48; H01R 9/223
See application file for complete search history.

(56) References Cited

U.S. PATENT DOCUMENTS 4,454,382 A * 6/1984 Borne .................... H02B 1/052 439/817
5,174,767 A * 12/1992 Diekmann ........... H01R 9/2691 439/94
11,594,829 B2 * 2/2023 Wu .......................... H01R 9/26
2021/0151911 A1 * 5/2021 Wu ...................... H01R 13/627

* cited by examiner

*Primary Examiner* — Phuong Chi Thi Nguyen
(74) *Attorney, Agent, or Firm* — Rosenberg, Klein & Lee

(57) ABSTRACT

A conductive component structure of rail-type terminal device includes a conductive component disposed in an insulation case body. The conductive component has a first section and a second section connected with the base section. The first section and the second section are respectively formed with a bow portion, a first portion and a second portion. A load arm and an elastic unit assembled with the load arm are disposed on the first section and/or the second section. The elastic unit includes a first elastic section and a second elastic section. The load arm passes through the first elastic section and at least a part of the second elastic section. When the load arm is displaced or moved, the first elastic section and the second elastic section respectively provide tension (or pushback force) and pulling force effect so as to improve the shortcoming of the conventional terminal device.

41 Claims, 12 Drawing Sheets

CONDUCTIVE COMPONENT STRUCTURE OF RAIL-TYPE TERMINAL DEVICE

BACKGROUND OF THE INVENTION

1. Field of the Invention

The present invention relates generally to a conductive component structure of rail-type terminal device, and more particularly to a conductive component structure of rail-type terminal device, in which the conductive component has a load arm assembled with a first elastic section and a second elastic section of the elastic unit to help in enhancing the elastic holding and securing effect of the conductive component.

2. Description of the Related Art

A conventional terminal device or wire pressing terminal has an insulation case (generally made of plastic material), a metal component (or so-called electrical conductive component) and a leaf spring conductor (or so-called metal leaf spring). The metal component and the leaf spring conductor are enclosed in the insulation case to press and electrically connect with or release a conductive wire plugged in the terminal device.

Such electrical connection terminal devices include two types. The first type of electrical connection terminal device is inserted on a circuit board such as printed circuit board (PCB). For example, EP 2325947 A1 discloses typical examples. The second type of electrical connection terminal device is latched with a grounding rail (or conductive rail) in a row to set up a common grounding device of an electrical apparatus or mechanical equipment for conducting out the residual voltage or static of the machine. For example, US 2013/0143433 A1 "connection terminal", US 2014/0127932 A1 "electrical connection terminal" and U.S. Pat. No. 5,362,259 "ground conductor terminal" disclose typical embodiments.

Such electrical connection terminal (or rail-type electrical connection terminal) generally includes an insulation case having a wire plug-in hole for the conductive wire to plug into the interior of the case. The case defines a chamber in which a plate-shaped conductive support (or conductive component) is mounted for pivotally connecting with a grounding conductive wire coining from a machine or an apparatus. The conductive component has a metal grounding member, which is soldered, riveted or connected on the conductive support. The metal grounding member has two ends respectively fastened on a grounding rail (or conductive rail). An operator can use a tool (such as a screwdriver) to hook and pull a hook-shaped foot section formed on a lower side of the insulation case. The foot section drives one end of the grounding member to make the same outward deform and deflect so as to unfasten the grounding member from the rail.

The assembling structure of the conventional electrical connection terminal has some shortcomings in structure and operation application. For example, an operator needs to outward hook and pull the structures of two ends of the grounding member to make the same deform for unfastening the grounding member from the rail. In the case of improper operation and/or long-term (or highly frequent) use, the fastening and securing effect of the grounding member to the rail in successive use is apt to be deteriorated. This consequently affects the conductive effect of the conductive component.

A conventional terminal structure employing multiple side-by-side assembled grounding members has been also disclosed. For example, EP 1 860 738 A1 discloses typical embodiments.

However, as well known by those who are skilled in this field, the structural form of multiple side-by-side assembled grounding members not only leads to increase of material cost, but also requires very great operation force applied to the grounding members for pulling the grounding members to outward deflect. Therefore, it is laborious to operate.

In order to improve the aforesaid shortcomings, a structural form of a grounding member assembled an elastic member has been disclosed. The grounding member has a base section pivotally connectable with a conductive connector, a first section and a second connected with the base section. The first and second sections are respectively formed with a bow portion and a first portion and a second portion connected with the bow portion. The first and second portions can be respectively fastened on a grounding rail. In addition, a load arm and a U-shaped elastic member assembled with the load arm are respectively disposed on the first section and/or the second section. In response to the motion of the first portion and/or the second portion, the U-shaped elastic member stores compression energy or release compression energy to help in enhancing the elastic securing effect (force) of the first portion and/or the second portion fastened on the grounding rail.

It should be noted that the aforesaid U-shaped elastic member singly provides a pushback action force after compressed. In normal state, the U-shaped elastic member is repeatedly compressed and deformed and then restored to its initial state. In the case of long-term (or highly frequent) use, material fatigue of the elastic member is easy to take place or even the elastic member will be disabled. This will deteriorate or reduce the assistance effect of the elastic member in securely fastening the grounding member on the rail. This is not what we expect.

To speak representatively, the above reveals some shortcomings existing in the conventional electrical connection terminal device in structure assembly design and application. In case the structural form of the conductive component or the grounding member is redesigned to be different from the conventional electrical connection terminal, the use form of the electrical connection terminal can be changed to practically widen the application range thereof.

It is found that the structural form of an optimal terminal device or conductive component must overcome or improve the aforesaid shortcomings of the conventional electrical connection terminal and include several design considerations as follows:

1. The structure or assembling structure of the conductive component (or the grounding member) and the elastic unit should be redesigned so that it is unnecessary to selectively use special metal material (such as the high-performance material with higher resistance against pressure (yield point)) or simply increase the number of the elastic units so as to prolong the lifetime of the elastic unit.
2. An elastic unit structure and/or conductive component structure is provided. When an operator operates the conductive component to (displace) move, the elastic unit has or provides two force systems of both pressure resistant effect and tensile effect so as to prolong the lifetime of the elastic unit and enhance the effect of the elastic unit. This improves the shortcoming of the conventional electrical connection terminal that in case single elastic action force is lost, the assistance of the elastic member in securely fastening the grounding member on the rail is deteriorated or reduced.

The aforesaid pressure resistant effect means that when the elastic unit is compressed to store energy, the elastic unit will instinctively provide (tension) pushback force or restore to its initial state. The tensile effect means when tensioned to store energy, the elastic unit will instinctively provide back pulling force or restore its initial state.

All the above issues are not taught or substantially disclosed in the above references.

SUMMARY OF THE INVENTION

It is therefore a primary object of the present invention to provide a conductive component structure of rail-type terminal device, which includes a conductive component disposed in an insulation case body. The conductive component has a base section, a first section and a second section connected with the base section. The first section and the second section are respectively formed with a bow portion, a first portion and a second portion connected with the bow portion and fastened on a grounding rail. A load arm and an elastic unit assembled with the load arm are disposed on the first section and/or the second section. The elastic unit includes a first elastic section and a second elastic section. The load arm passes through the first elastic section and at least a part of the second elastic section. When the load arm is (displaced) or moved, in response to the (displacement) or motion of the load arm, the first elastic section and the second elastic section (at the same time) respectively provide tension (or pushback force) and pulling force effect so as to enhance the secure connection force of the conductive component fastened on the grounding rail. Accordingly, elastic fatigue of the elastic unit is not easy to take place. This improves the shortcoming of the conventional terminal device that in case of long-term (or highly frequent) use of one single elastic member, elastic (or material) fatigue of the elastic member is easy to take place to affect the securing effect.

In the above conductive component structure of rail-type terminal device, the first elastic section and the second elastic section respectively have main arms and subsidiary arms and (bow-shaped) bridge sections connected between the main arms and the subsidiary arms. The subsidiary arm of the first elastic section is connected with the main arm of the second elastic section. The load arm at least passes through the main arm and the subsidiary arm of the first elastic section and the main arm of the second elastic section. When the load arm is (displaced) and moved, in response to the (displacement) and motion of the load arm, the first elastic section is compressed, while the second elastic section is tensioned. When the load arm is moved back or restored to its home position, the first elastic section releases the stored energy to provide tension (or pushback force) effect, while the second elastic section releases the stored energy to provide tensile (or back pulling force). This helps in restoring the first portion and the second portion to their initial states.

In the above conductive component structure of rail-type terminal device, a (bow-shaped) subsidiary bridge section is formed between the subsidiary arm of the first elastic unit and the main arm of the second elastic section, whereby the elastic unit substantially has the form of an M-shaped structure or the elastic unit substantially has the form of a waved structure (or has a system of third elastic section). This enhances the pressure resistant effect (or pushback force) of the elastic unit (or the first elastic section) and the tensile effect (or back pulling force) of the second elastic section.

In the above conductive component structure of rail-type terminal device, the subsidiary arm of the second elastic section (and/or the first elastic section) is connected with a (bow-shaped) subsidiary bridge section. The subsidiary bridge section is connected with an extension arm. The extension arm is connected with a (bow-shaped) secondary bridge section. The secondary bridge section is connected with a secondary arm, whereby the second elastic section (and/or the first elastic section) substantially has the form of an M-shaped structure or the elastic unit substantially has the form of a waved structure.

The present invention can be best understood through the following description and accompanying drawings, wherein:

DETAILED DESCRIPTION OF THE PREFERRED EMBODIMENTS

Figure 1:
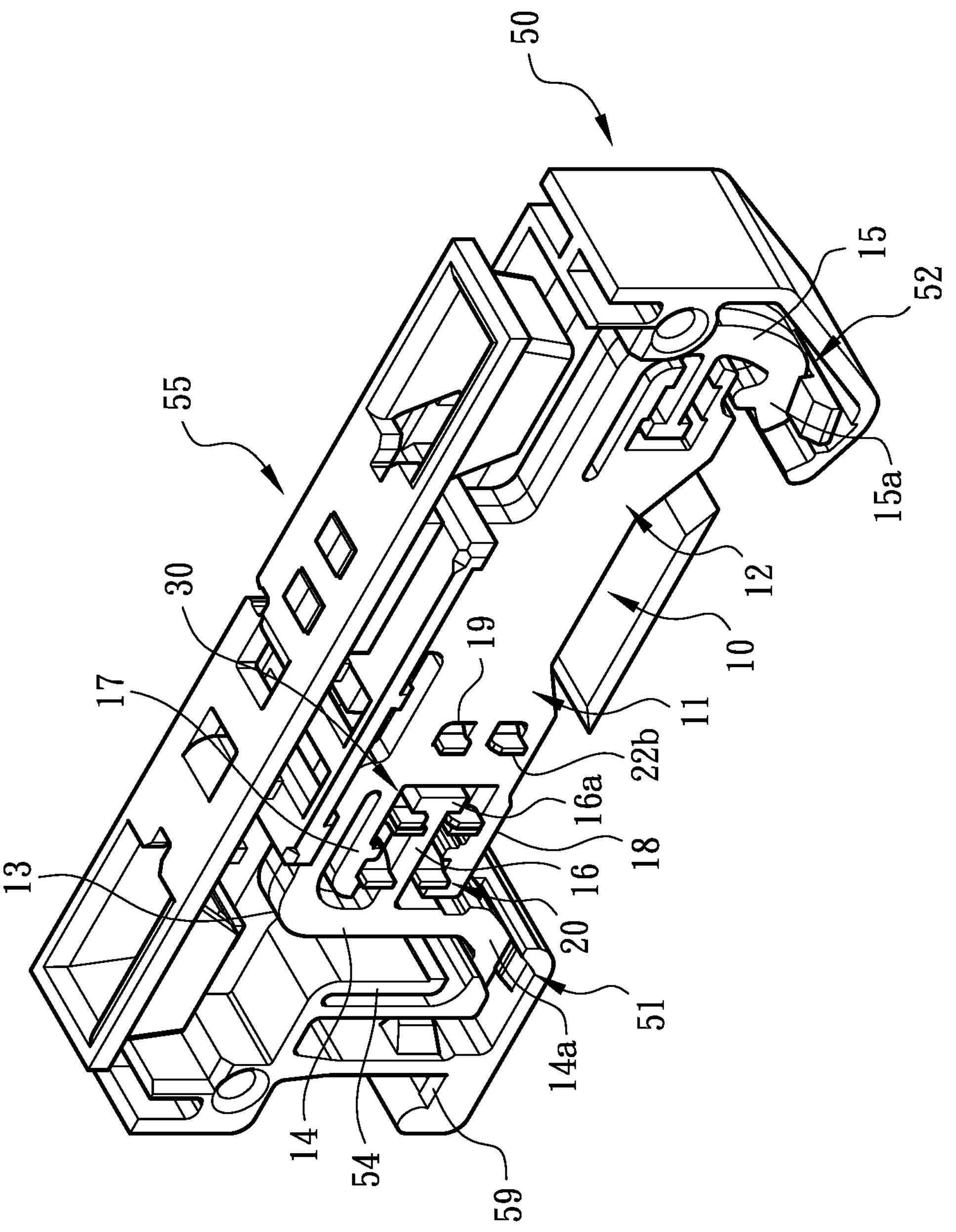
FIG. 1 is a perspective view showing the assembly of the conductive component and the case body of the present invention.
Figure 2:
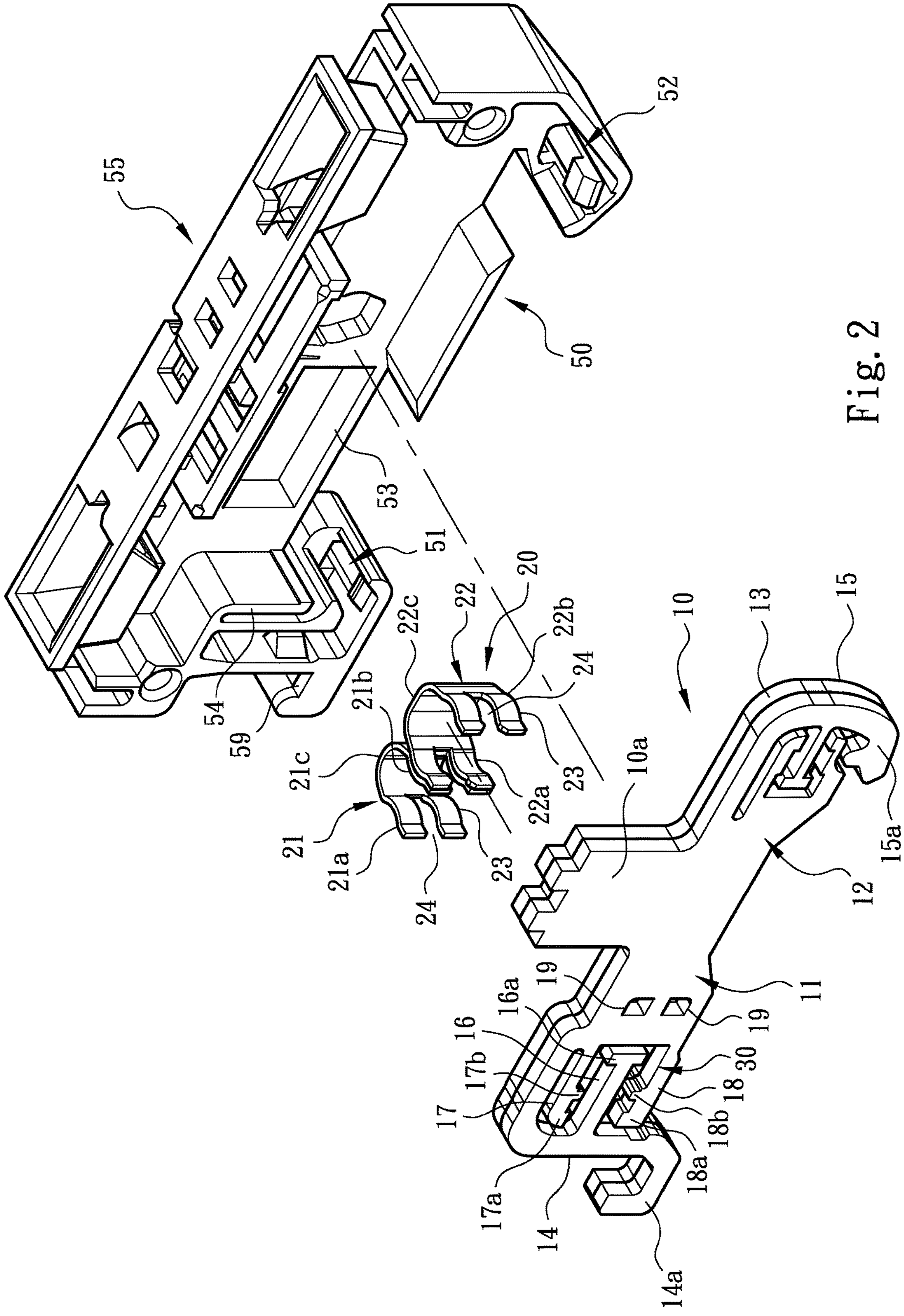
FIG. 2 is a perspective exploded view according to FIG. 1, showing the structures of the case body, the conductive component and the elastic unit.
Figure 3:
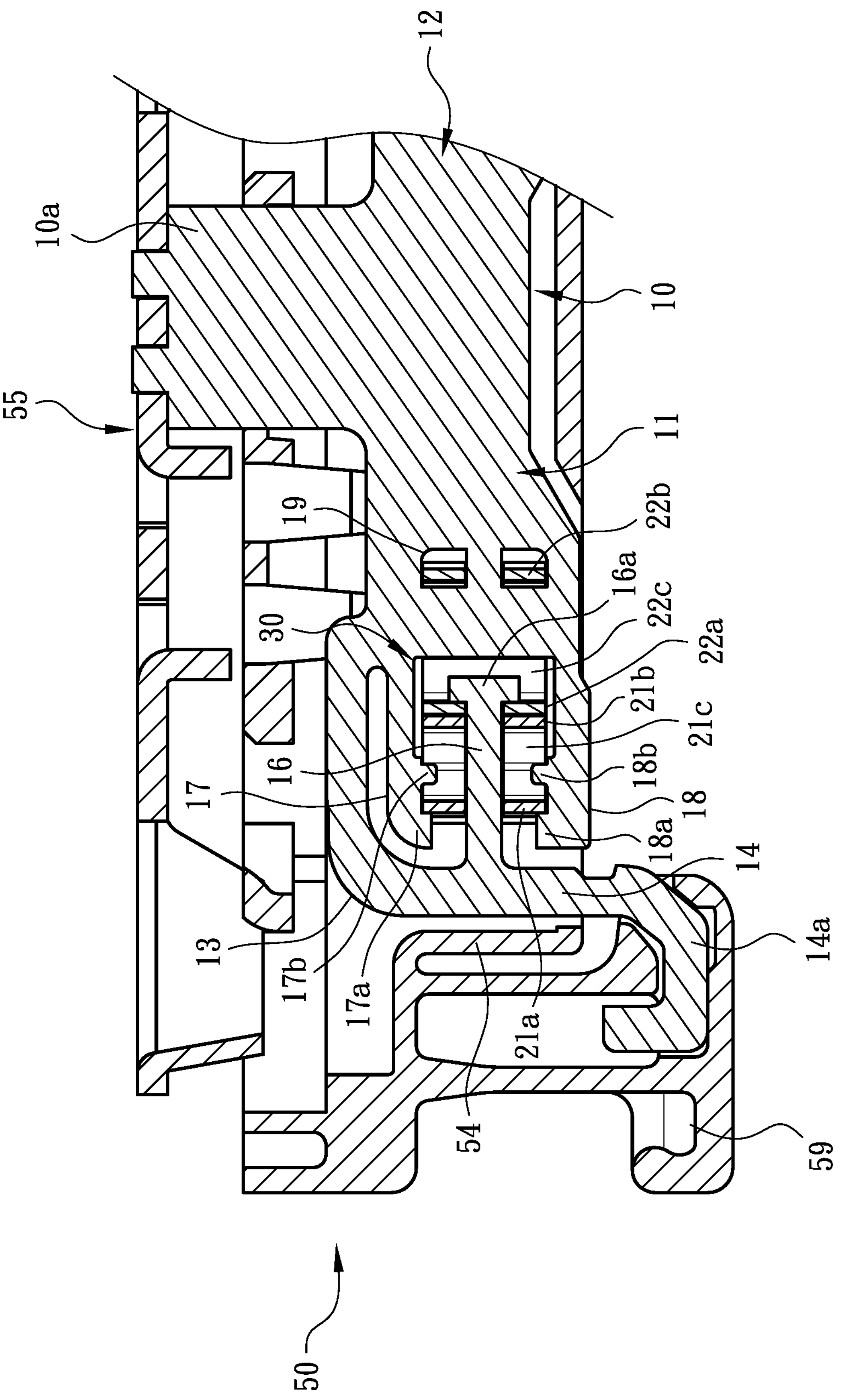
FIG. 3 is a plane sectional view according to FIG. 1.

Please refer to FIGS. 1, 2 and 3. The conductive component structure of the rail-type terminal device of the present invention includes a conductive component (or grounding member) 10. The conductive component 10 is mounted in a case body 50 made of insulation material to form an electrical terminal device or wire connection terminal. (The case body 50 has a conductive module 55 for conductive wires to plug in and connect therewith).

The upper section, upper side, lower section, lower side, right side, left side, lateral side, etc. mentioned hereinafter are recited with the direction of the drawings as the reference direction.

In a preferred embodiment, the conductive component 10 substantially has the form of a plate-shaped structure having a base section 10*a* assembled with the conductive module 55, a first section 11 and a second section 12 connected with the base section 10*a* and extending to two lateral sides of the drawing. The first section 11 and the second section 12 are respectively formed with a bow portion 13, a first portion 14 and a second portion 15 connected with the bow portion 13. The first and second portions 14, 15 are respectively (elastically) fastened on a grounding rail (not shown) to achieve electrical grounding effect.

Basically, the case body 50 has a first assembling section 51 and a second assembling section 52 respectively assembled with or locating a tail section 14*a* of the first portion 14 and a tail section 15*a* of the second portion 15 to help the case body 50 in receiving or locating the conductive component 10.

As shown in the drawings, a load arm 16 and an elastic unit 20 assembled with the load arm 16 are disposed on the first section and/or the second section 12. The elastic unit 20 includes a first elastic section 21 and a second elastic section 22. The load arm 16 passes through the first elastic section 21 and at least a part of the second elastic section 22. When the load arm 16 is (displaced) moved, in response to the (displacement) motion of the load arm 16, the first and second elastic sections 21, 22 (at the same time) respectively provide tension (or pushback force) and pulling force effect. This enhances the secure connection force of the conductive component 10 fastened on the grounding rail. Also, elastic fatigue of the elastic unit 20 is not easy to take place so as to improve the shortcoming of the conventional conductive component that in the case of long-term (or highly frequent) use, elastic (or material) fatigue of one single elastic member is easy to take place to affect the securing effect.

To speak more specifically, the first section 11 and/or the second section 12 define a space 30. In an area in adjacency to the space 30, on the upper and lower sides of the load arm 16 are respectively disposed an upper arm 17, a shoulder section 17*a* connected with the upper arm 17, a lower arm 18 and a shoulder section 18*a* connected with the lower arm 18 on the first section 11 and/or the second section 12. In addition, an assembling section 19 in the form of perforation structure is disposed between the space 30 and the base section 10*a*.

In this embodiment, the upper arm 17 and the lower arm 18 are respectively formed with raised sections 17*b*, 18*b*. The shoulder section 17*a* of the upper arm 17 cooperates with the raised section 17*b* of the upper arm 17 and the shoulder section 18*a* of the lower arm 18 cooperates with the raised section 18*b* of the lower arm 18 to help in mounting the elastic unit 20.

It should be noted that the raised section 17*b* and/or the raised section 18*b* also serve as restriction systems for restraining the motional range or displacement of the first elastic section 21 and/or the second elastic section 22 to lower the possibility of deformation or elastic (or material) fatigue of the first portion 14 and second portion 15 and/or the first elastic section 21 and second elastic section 22 due to improper operation of an operation or long-term (or highly frequent) use.

As shown in FIGS. 2 and 3, the load arm 16 is a T-shaped structure having a subsidiary section 16*a*. One end of the load arm 16 is connected with the first portion 14 (and/or the second portion 15). The other end or at least a part (and the subsidiary section 16*a*) of the load arm 16 are positioned in the space 30.

In this embodiment, the first elastic section 21 and the second elastic section 22 of the elastic unit 20 can be a two-piece structure or integrally connected with each other to form a substantially M-shaped structure. The first elastic section 21 and/or the second elastic section 22 of the elastic unit 20 alternatively can have the form of a coiled spring.

As shown in the drawings, the first elastic section 21 and the second elastic section 22 respectively have main arms 21*a*, 22*a* and subsidiary arms 21*b*, 22*b* and (bow-shaped) bridge sections 21*c*, 22*c* connected between the main arms 21*a*, 22*a* and the subsidiary arms 21*b*, 22*b*. The subsidiary arm 21*b* of the first elastic section 21 is attached to or connected with the main arm 22*a* of the second elastic section 22.

As shown in the drawings, the main arm 21*a* and the subsidiary arm 21*b* of the first elastic section 21 and the main arm 22*a* and the subsidiary arm 22*b* of the second elastic section 22 are respectively formed with arcuate sections 23 for enhancing the structural strength of the main arms 21*a*, 22*a* and the subsidiary arms 21*b*, 22*b*. In addition, the load arm 16 at least passes through the main arm 21*a* and the subsidiary arm 21*b* of the first elastic section 21 and the main arm 22*a* of the second elastic section 22, when the load arm 16 is (displaced) moved, in response to the (displacement) motion of the load arm 16, the first elastic section 21 is compressed, while the second elastic section 22 is tensioned.

Moreover, when the load arm 16 (and/or the subsidiary section 16*a*) is restored or moved back, the first elastic section 21 releases the stored energy to provide tension (or pushback force), while the second elastic section 22 releases the stored energy to provide pulling force (or back pulling force). This helps in storing the first portion 14 and/or the second portion 15 to their initial states (or home positions without being forced).

To speak more specifically, the main arm 21*a* and the subsidiary arm 21*b* of the first elastic section 21 and the main arm 22*a* and the subsidiary arm 22*b* of the second elastic section 22 are respectively formed with splits 24, which permit the load arm 16 to pass through and/or assembled with the load arm 16.

Therefore, the main arm 21*a* of the first elastic section 21 is positioned between the shoulder sections 17*a*, 18*a* and the raised sections 17*b*, 18*b*, whereby the main arm 21*a* of the first elastic section 21 is leant against the shoulder sections 17*a*, 18*a* (or the main arm 21*a* of the first elastic section 21 is positioned between the first portion 14 (and/or the second portion 15) and the raised sections 17*b*, 18*b*, whereby the main arm 21*a* of the first elastic section 21 is leant against the first portion 14 (and/or the second portion 15). The subsidiary arm 21*b* of the first elastic section 21 and the main arm 22*a* of the second elastic section 22 are positioned between the raised sections 17*b*, 18*b* and the subsidiary section 16*a*, whereby the main arm 22*a* of the second elastic section 22 is leant against the subsidiary section 16*a*. The subsidiary arm 22*b* of the second elastic section 22 is positioned on the assembling section 19.

In a preferred embodiment, the subsidiary arm 22*b* of the second elastic section 22 can be secured to the case body 50. Alternatively, the assembling section is disposed on the case body 50 for fixing the subsidiary arm 22*b* of the second elastic section 22. In addition, the case body 50 can be formed with a chamber 53 for (helping) receiving the elastic unit 20.

As shown in FIGS. 2 and 3, a stop section 54 in the form of a rib body is disposed on the case body 50 for restricting the moving distance or displacement of the first portion 14 (and/or the second portion 15) or the load arm 16 of the conductive component so as to lower the possibility of elastic (or material) fatigue or breakage of the first portion 14 (or the second portion 15) due to improper operation of an operation or long-term (or highly frequent) use, which will sequentially affect the fastening and securing effect of the rail and the conduction effect of the conductive component.

Figure 4:
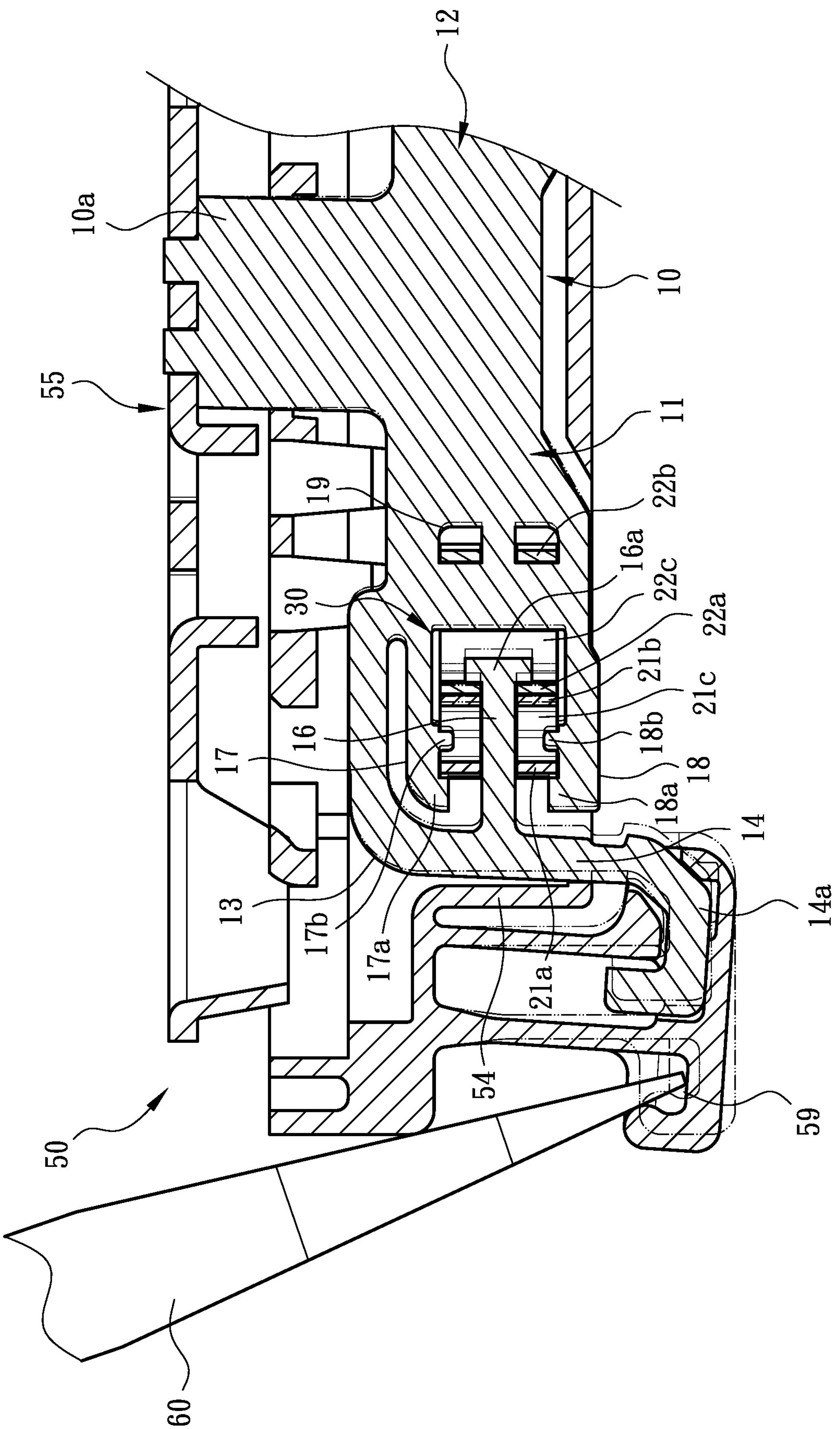
FIG. 4 is a sectional view showing the operation of the conductive component of the present invention, in which the conductive component moves in response to the operation of an operator.

Please refer to FIG. 4. When an operator operates a tool 60 (such as a screwdriver) to pull a foot-like section 59 on a lower side of the case body 50 outward (or toward the left side of the drawing), the case body 50 will drive the first portion 14 of the conductive component to move toward the left side of the drawing. In cooperation with the first portion 14, which moves to the position of the stop section 54, some motions take place as follows:

1. The load arm 16 (and the subsidiary section 16*a*) drives the subsidiary arm 21*b* of the first elastic section 21 and the main arm 22*a* of the second elastic section 22 to move toward the left side of the drawing (as shown by the solid line of FIG. 4). At this time, the first elastic section 21 of the elastic unit 20 is compressed to store energy and provide a pressure resistant action force (or pushback force).
2. The load arm 16 (and the subsidiary section 16*a*) at the same time drives the main arm 22*a* of the second elastic section 22 to move toward the left side of the drawing, whereby with the assembling section 19 serving as a support point, the subsidiary arm 22*b* of the second elastic section 22 is tensioned to store energy and provide tensile action force (or back pulling force).

That is, the operator can perform the above operation to unfasten the first portion (and/or the second portion 15) from the rail.

When the operation force disappears, the first elastic section 21 of the elastic unit 20 will release the previously stored energy due to compression, whereby the subsidiary arm 21*b* of the first elastic section 21 pushes back the subsidiary section 16*a* of the load arm 16 to move toward the right side of the drawing. Also, the second elastic section 22 will release the previously stored energy due to tension, whereby the main arm 22*a* of the second elastic section 22 pulls back the subsidiary section 16*a* of the load arm 16 to move toward the right side of the drawing to together help in elastically storing the first portion 14 (and/or the second portion 15) to their initial positions as shown by the phantom line of FIG. 4.

It should be noted that when an operator operates the conductive component 10 to fasten with the (grounding) rail, the first portion 14 (and/or the second portion 15) is slightly (expanded) tensioned. At the same time, the load arm 16 (or the subsidiary section 16*a*) is driven to make the first elastic section 21 of the elastic unit 20 provide a pressure resistant action force (or pushback force) and/or make the second elastic section 22 provide a tensile action force (or back pulling force), whereby the elastic unit 20 helps in enhancing the fastening force and security of the conductive component 10 (for fastening the conductive component on the rail).

Figure 5:
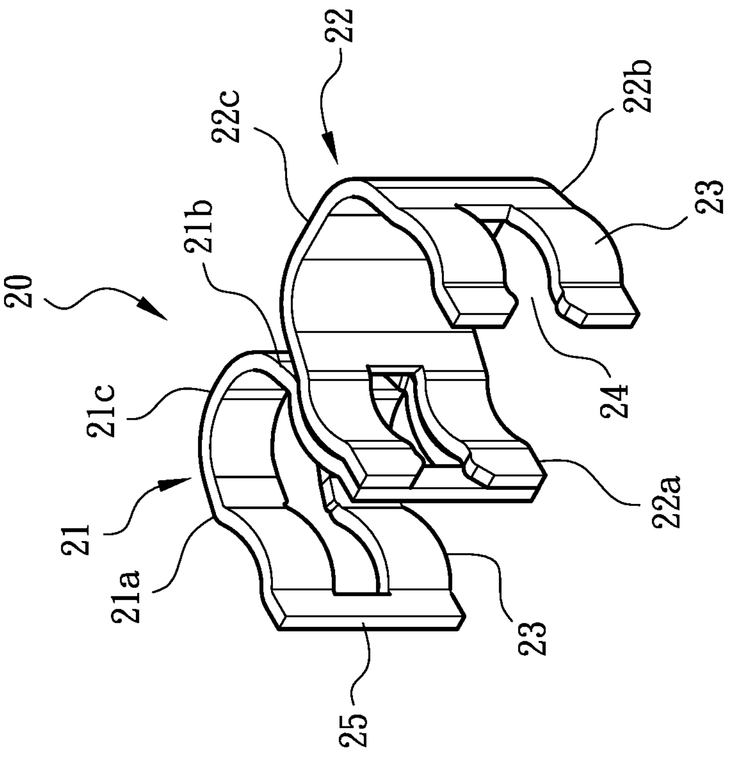
FIG. 5 is a perspective exploded view of a preferred embodiment of the elastic unit of the present invention, showing the structure of the elastic unit.

Please refer to FIG. 5, which shows the structure of a preferred embodiment of the elastic unit 20 of the present invention. The first elastic section 21 of the elastic unit 20 is a U-shaped structure. The split 24 extends along the main arm 21*a* of the first elastic section 21 (or the U-shaped structure) through the bridge section 21*c* to the subsidiary arm 21*b*. In addition, the tail end of the main arm 21*a* and the tail end of the subsidiary arm 21*b* are respectively formed with closed section 25. Therefore, when the load arm 16 is assembled with the split 24 of the first elastic section 21, the closed sections 25 help in securely assembling the split 24 of the first elastic section 21 with the load arm 16.

FIG. 5 also shows that the arcuate sections 23 of the main arm 21*a* and the subsidiary arm 21*b* of the first elastic section 21 are arced structures bent toward each other, while the arcuate sections 23 of the main arm 22*a* and the subsidiary arm 22*b* of the second elastic section 22 are arced structures bent away from each other. Accordingly, the arcuate section 23 of the main arm 22*a* of the second elastic section 22 is overlapped with or attached to the arcuate section 23 of the subsidiary arm 21*b* of the first elastic section 21.

Figure 6:
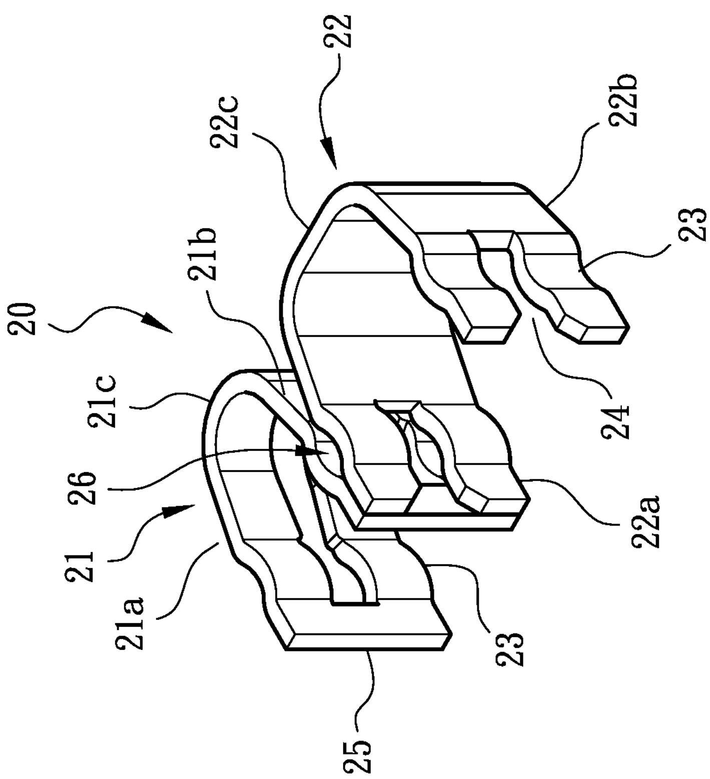
FIG. 6 is a perspective exploded view of a modified embodiment of the elastic unit of the present invention, showing the structure of the elastic unit.

Please refer to FIG. 6, which shows the structure of a modified embodiment of the elastic unit 20 of the present invention. The arcuate sections 23 of the main arm 21*a* and the subsidiary arm 21*b* of the first elastic section 21 are arced structures bent toward each other and the arcuate sections 23 of the main arm 22*a* and the subsidiary arm 22*b* of the second elastic section 22 are arced structures also bent toward each other. Accordingly, the arcuate section 23 of the main arm 22*a* of the second elastic section 22 and the arcuate section 23 of the subsidiary arm 21*b* of the first elastic section 21 together define a void section 26.

Figure 7:
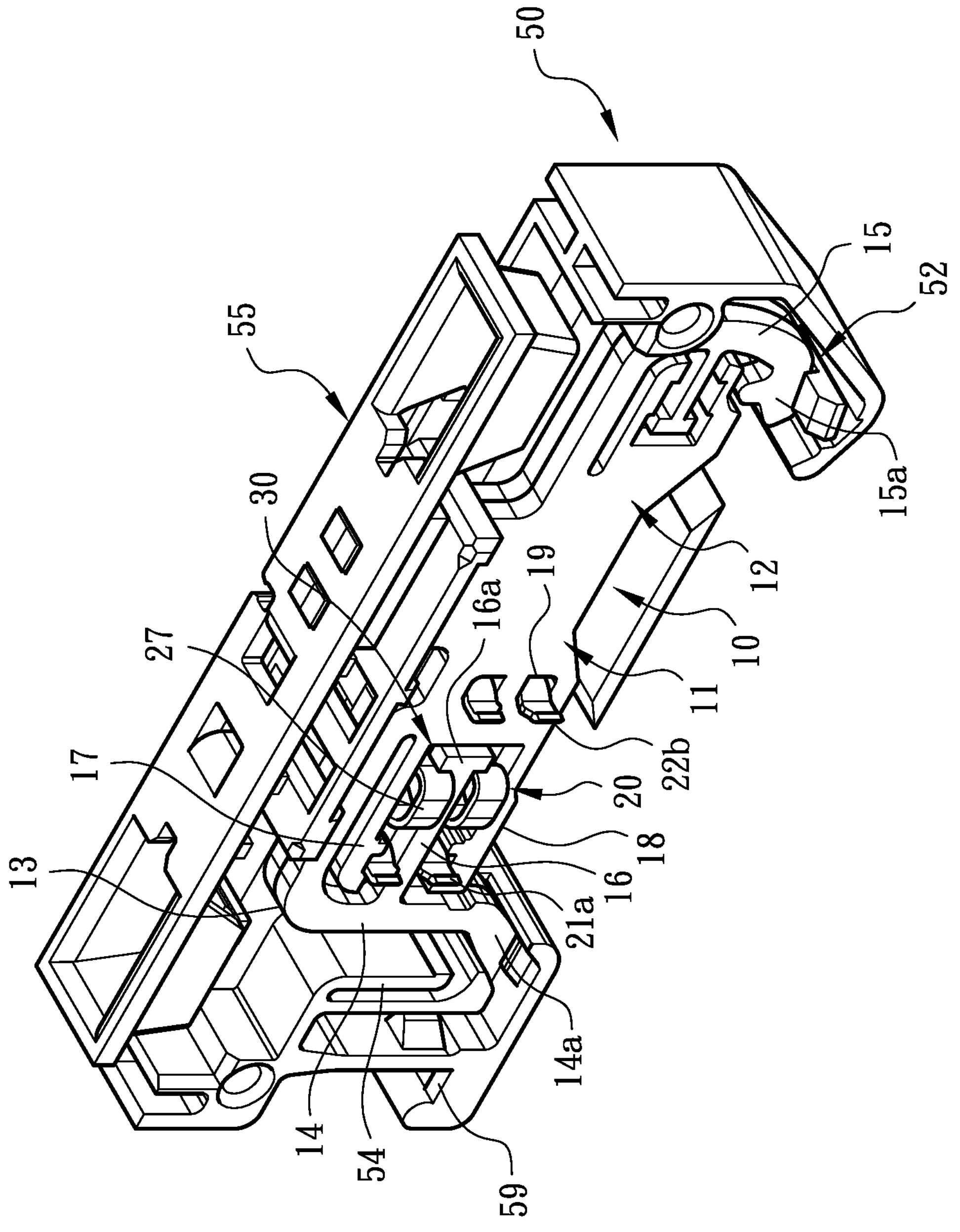
FIG. 7 is a perspective view showing the assembly of the conductive component and the case body of the present invention.
Figure 8:
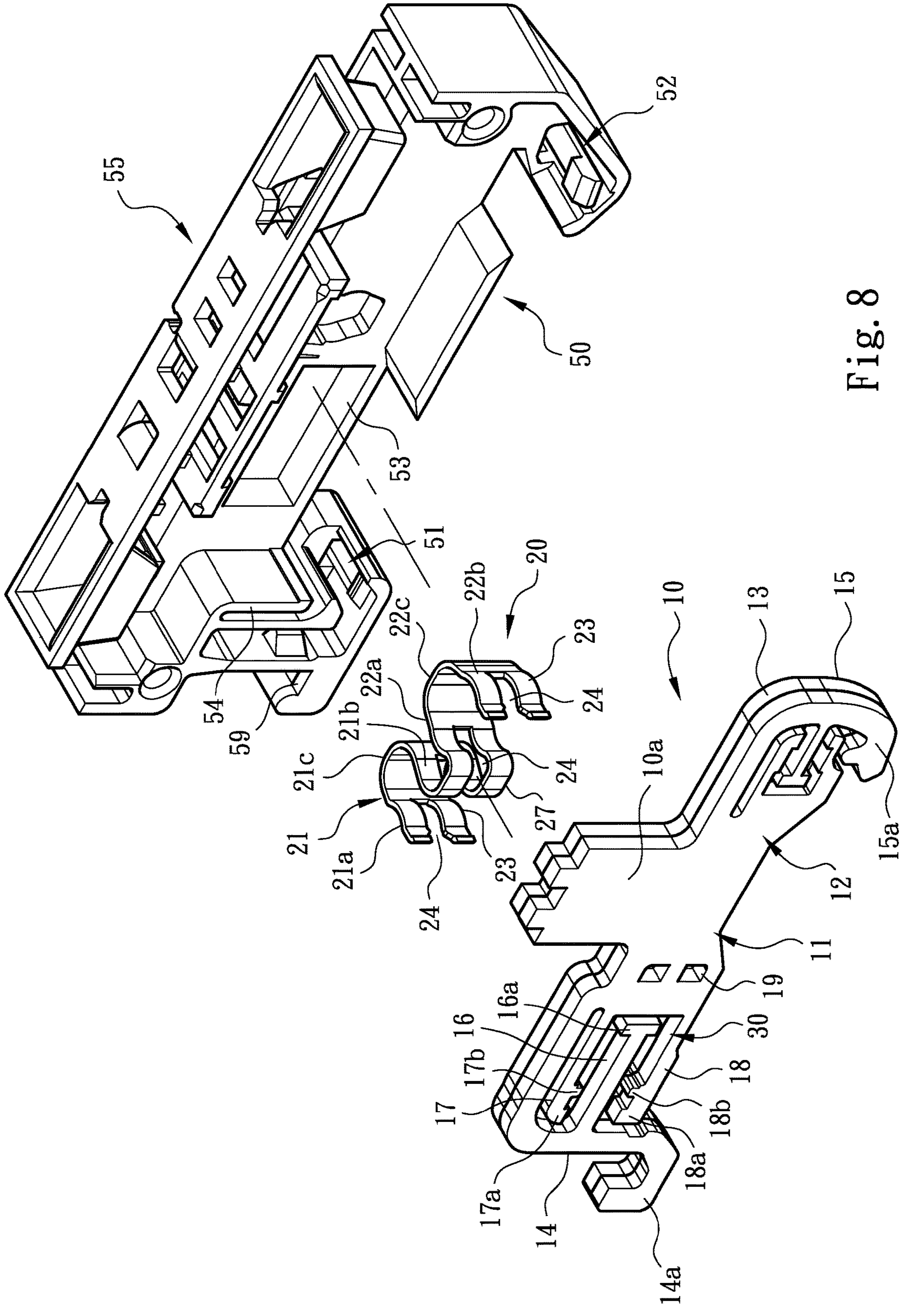
FIG. 8 is a perspective exploded view according to FIG. 7, showing the structures of the case body, the conductive component and the elastic unit.
Figure 9:
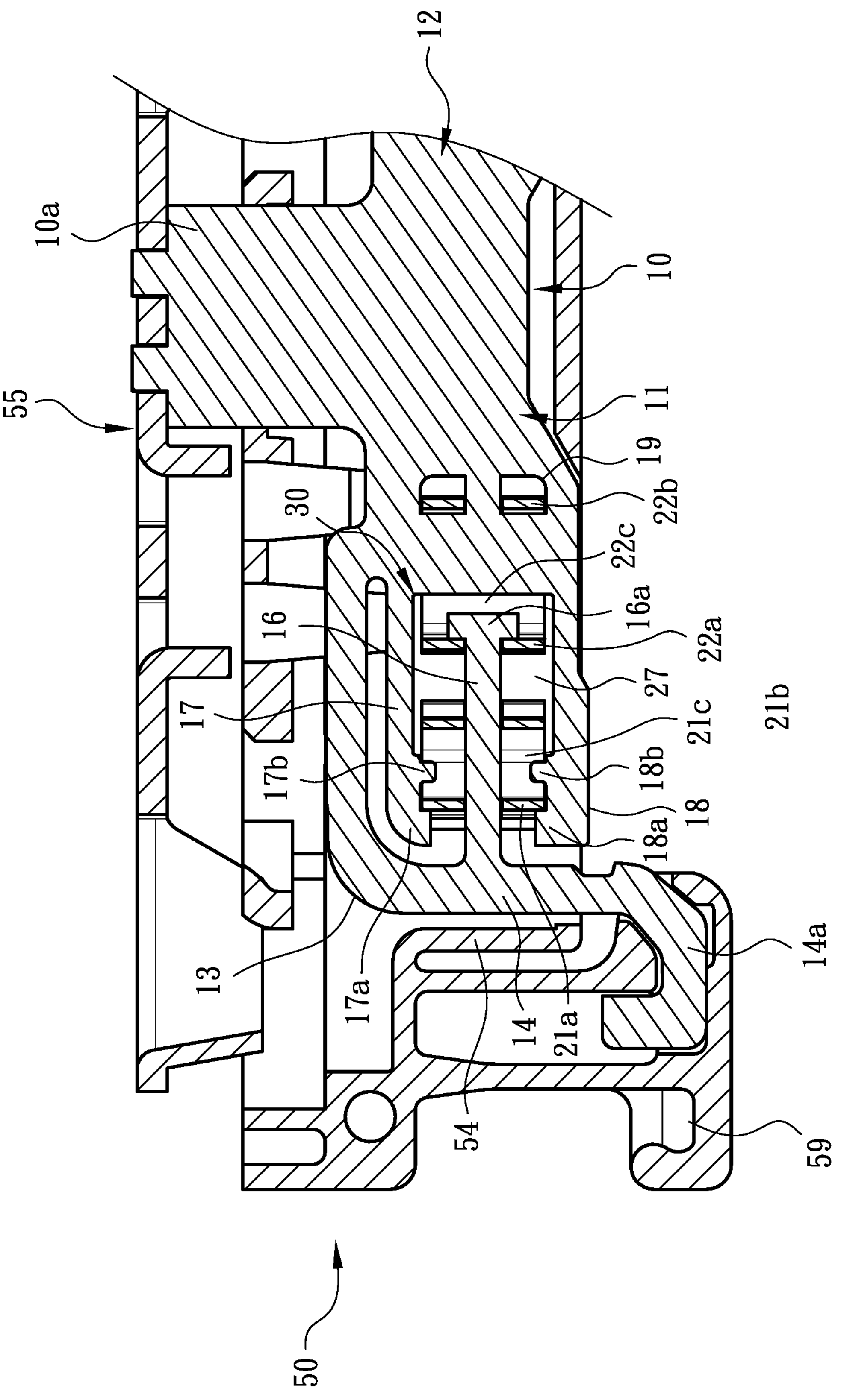
FIG. 9 is a plane sectional view according to FIG. 7.

Please refer to FIGS. 7, 8 and 9, which show the structure of a modified embodiment of the elastic unit 20 in adaptation to the case body 50 of the present invention. The elastic unit 20 has a (bow-shaped) subsidiary bridge section 27 formed between the subsidiary arm 21*b* of the first elastic unit 21 and the main arm 22*a* of the second elastic section 22, whereby the elastic unit 20 substantially has the form of an M-shaped structure or the elastic unit 20 substantially has the form of a waved structure (or has a system of third elastic section). This enhances the pressure resistant effect (or pushback force) of the elastic unit 20 (or the first elastic section 21) and the tensile effect (or back pulling force) of the second elastic section 22.

In this embodiment, the subsidiary bridge section 27 is also formed with a split 24 connected with the split 24 of the subsidiary arm 21*b* of the first elastic section 21 and the split 24 of the main arm 22*a* of the second elastic section 22. As shown in the drawings, the load arm 16 at least passes through the main arm 21*a* and the subsidiary arm 21*b* of the first elastic section 21 and the subsidiary bridge section 27 and the main arm 22*a* of the second elastic section 22. Therefore, when the load arm 16 is (displaced) moved, in response to the (displacement) motion of the load arm 16, the first elastic section 21 (and/or the subsidiary bridge section 27) is compressed, while the second elastic section 22 is tensioned.

When the load arm 16 (and/or the subsidiary section 16*a*) is restored or moved back, the first elastic section 21 (and/or the subsidiary bridge section 27) releases the stored energy to provide tension (or pushback force), while the second elastic section 22 releases the stored energy to provide pulling force (or back pulling force). This helps in storing the first portion 14 and/or the second portion 15 to their initial states (or home positions without being forced).

To speak more specifically, the main arm 21*a* of the first elastic section 21 is positioned between the shoulder sections 17*a*, 18*a* and the raised sections 17*a*, 18*b*, whereby the main arm 21*a* of the first elastic section 21 is leant against the shoulder sections 17*a*, 18*a* (or the main arm 21*a* of the first elastic section 21 is positioned between the first portion 14 (and/or the second portion 15) and the raised sections 17*b*, 18*b*, whereby the main arm 21*a* of the first elastic section 21 is leant against the first portion 14 (and/or the second portion 15). The subsidiary arm 21*b* of the first elastic section 21, the subsidiary bridge section 27 and the main arm 22*a* of the second elastic section 22 are positioned between the raised sections 17*b*, 18*b* and the subsidiary section 16*a*, whereby the main arm 22*a* of the second elastic section 22 is leant against the subsidiary section 16*a*. The subsidiary arm 22*b* of the second elastic section 22 is positioned on the assembling section 19 (or the subsidiary arm 22*b* of the second elastic section 22 is secured to the case body 50 (or the assembling section of the case body 50)).

Figure 10:
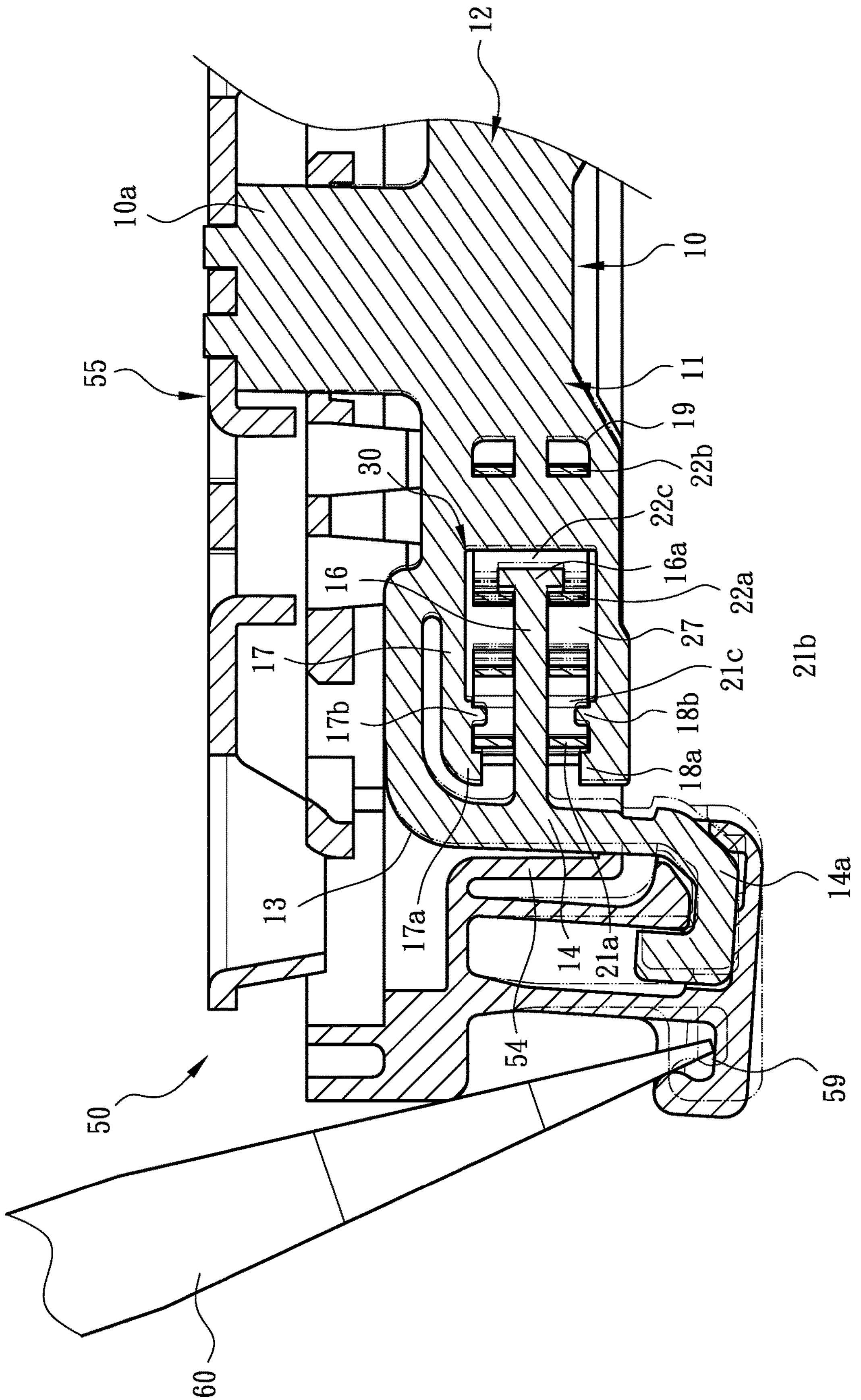
FIG. 10 is a sectional view showing the operation of the conductive component of the present invention according to FIG. 9, in which the conductive component moves in response to the operation of an operator.

Please refer to FIG. 10. When an operator operates a tool 60 (such as a screwdriver) to pull the foot-like section 59 on the lower side of the case body 50 outward (or toward the left side of the drawing), the case body 50 will drive the first portion 14 of the conductive component to move toward the left side of the drawing. In cooperation with the first portion 14, which moves to the position of the stop section 54, some motions take place as follows:

1. The load arm 16 (and the subsidiary section 16*a*) drives the subsidiary arm 21*b* of the first elastic section 21 and the main arm 22*a* of the second elastic section 22 to move toward the left side of the drawing (as shown by the solid line of FIG. 10). At this time, the first elastic section 21 (and/or the subsidiary bridge section 27) of the elastic unit 20 is compressed to store energy and provide a pressure resistant action force (or pushback force).
2. The load arm 16 (and the subsidiary section 16*a*) at the same time drives the main arm 22*a* of the second elastic section 22 to move toward the left side of the drawing, whereby with the assembling section 19 serving as a support point, the subsidiary arm 22*b* of the second elastic section 22 is tensioned to store energy and provide tensile action force (or back pulling force).

When the operation force disappears, the first elastic section 21 of the elastic unit 20 (and/or the subsidiary bridge section 27) will release the previously stored energy due to compression, whereby the subsidiary arm 21*b* of the first elastic section 21 (and/or the subsidiary bridge section 27) pushes back the subsidiary section 16*a* of the load arm 16 to move toward the right side of the drawing. Also, the second elastic section 22 will release the previously stored energy due to tension, whereby the main arm 22*a* of the second elastic section 22 pulls back the subsidiary section 16*a* of the load arm 16 to move toward the right side of the drawing to together help in elastically storing the first portion 14 (and/or the second portion 15) to their initial positions as shown by the phantom line of FIG. 10.

Figure 11:
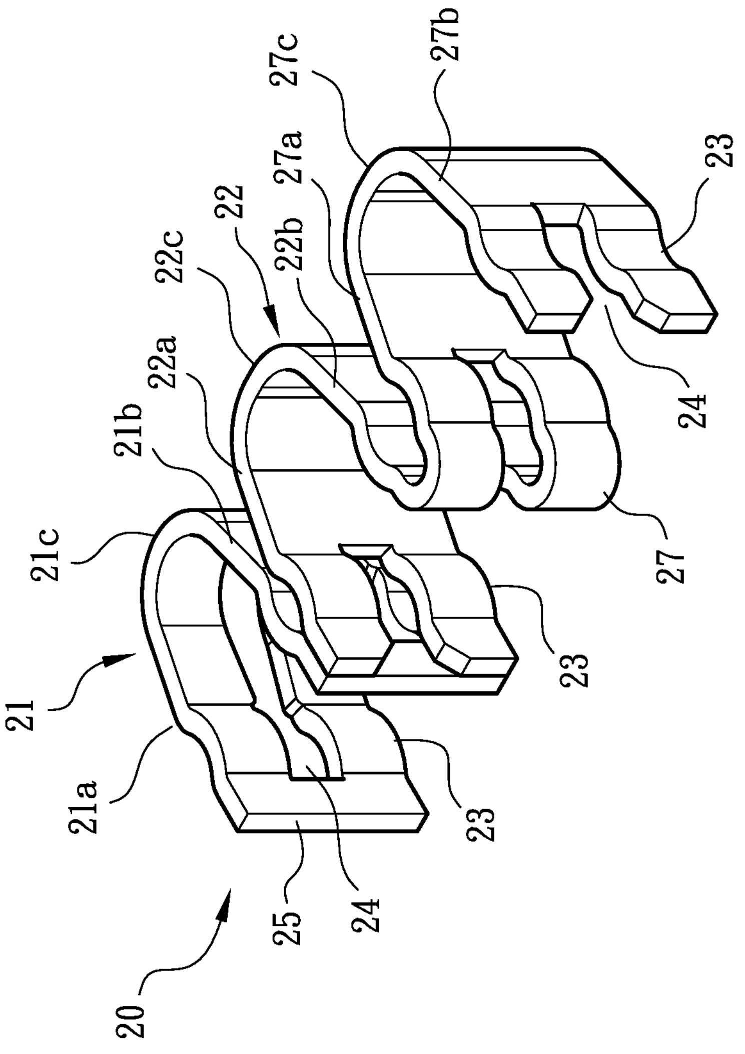
FIG. 11 is a perspective view of a modified embodiment of the elastic unit of the present invention, showing the structure of the elastic unit.

Please refer to FIG. 11, which shows the structure of a modified embodiment of the elastic unit 20. The subsidiary arm 22*b* (and/or the subsidiary arm 21*b*) of the second elastic section 22 (and/or the first elastic section 21) is connected with a (bow-shaped) subsidiary bridge section 27. The subsidiary bridge section 27 is connected with an extension arm 27*a*. The extension arm 27*a* is connected with a (bow-shaped) secondary bridge section 27*c*. The secondary bridge section 27*c* is connected with a secondary arm 27*b*, whereby the second elastic section 22 (and/or the first elastic section 21) substantially has the form of an M-shaped structure or the elastic unit 20 substantially has the form of a waved structure to form a system of a third elastic section and a fourth elastic section).

As shown in the drawing, at least a part of the subsidiary arm 22*b* of the second elastic section 22, the subsidiary bridge section 27, the extension arm 27*a* and the secondary arm 27*b* are formed with a split 24.

Figure 12:
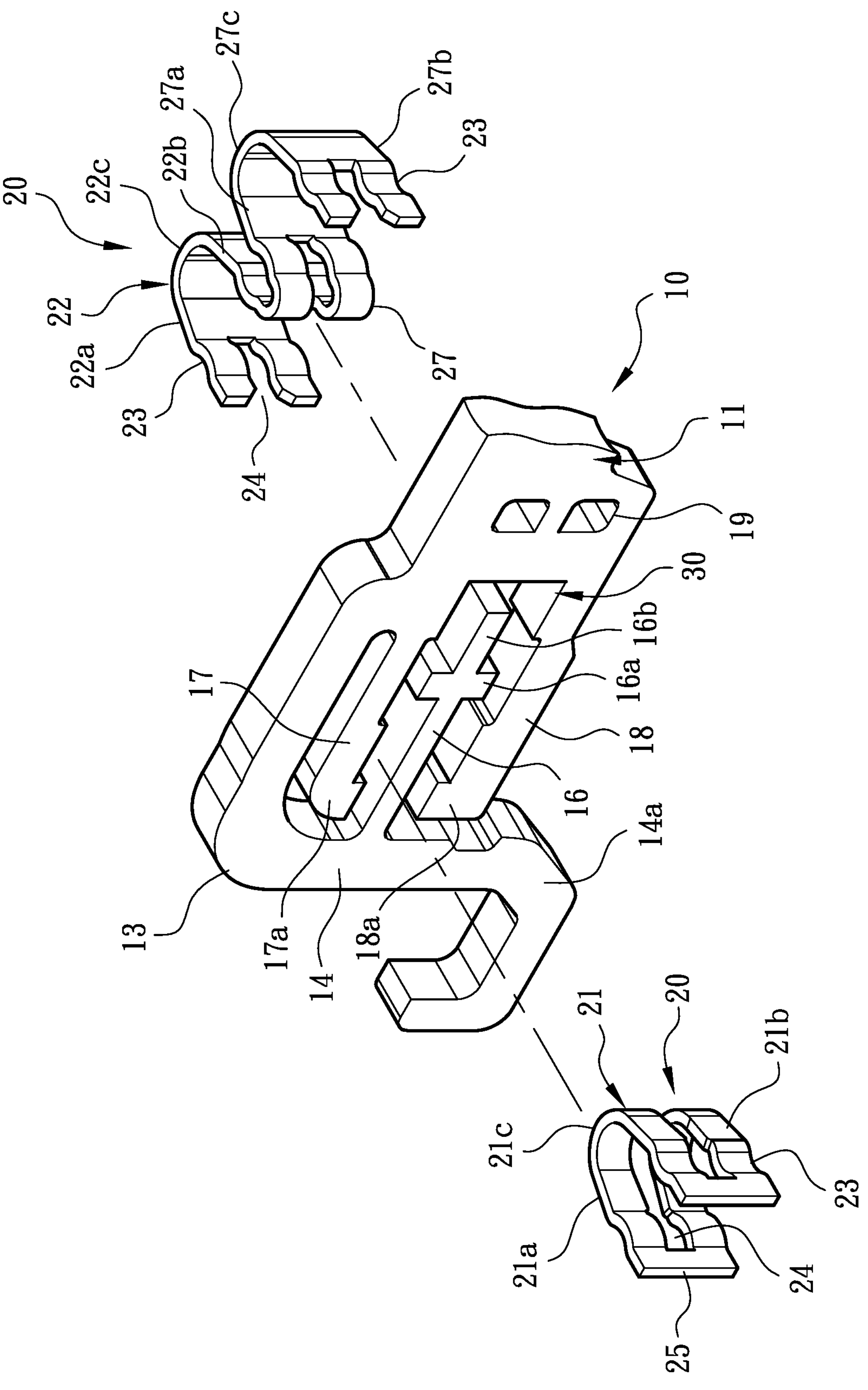
FIG. 12 is a perspective exploded view of a preferred embodiment of the conductive component of the present invention, showing the structures of the conductive component and the elastic unit.
Figure 13:
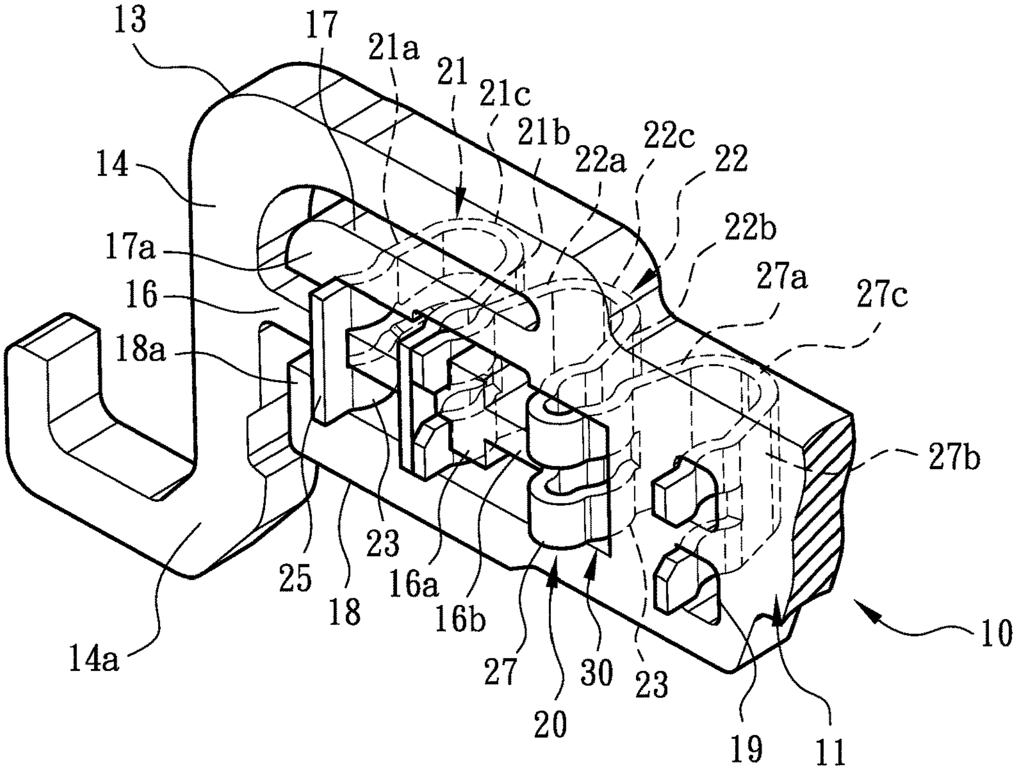
FIG. 13 is a perspective assembled view according to FIG. 12.

Please refer to FIGS. 12 and 13, which show the structures of the conductive component 10 and the elastic unit 20. The load arm 16 (or the subsidiary section 16*a*) is connected with a tail section 16*b* extending from the subsidiary section 16*a* and positioned in the space 30.

Figure 14:
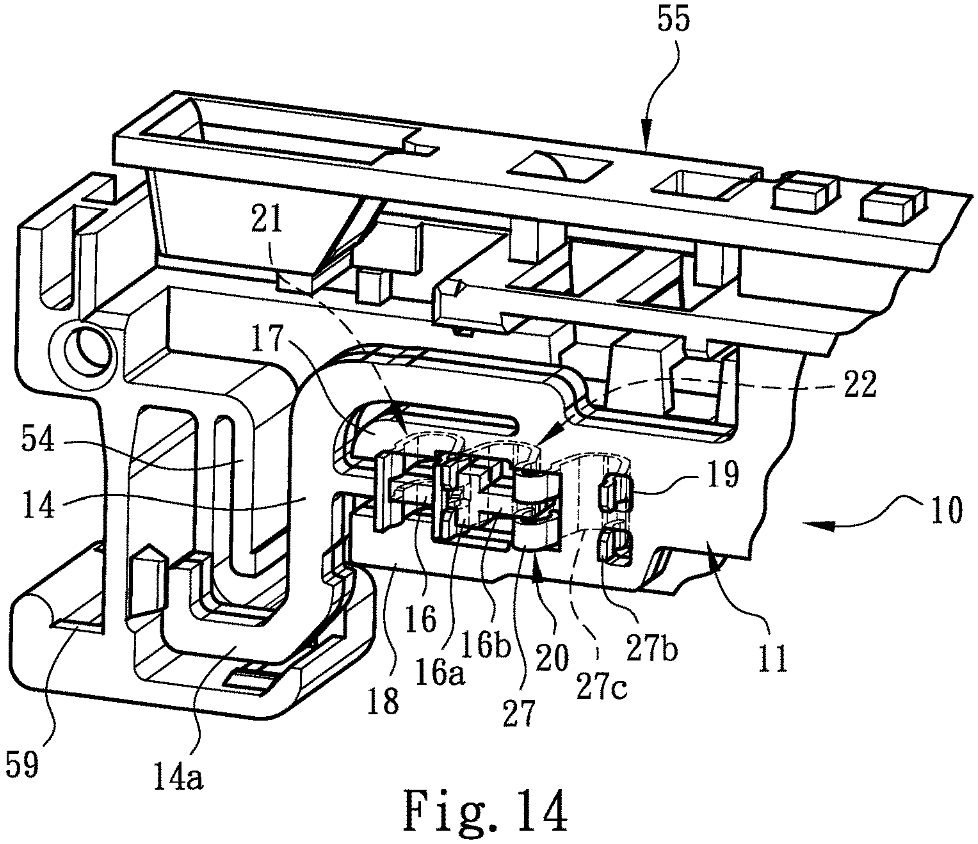
FIG. 14 is a perspective assembled view according to FIG. 13, showing that the conductive component is assembled with the case body.

Please refer to FIGS. 13 and 14. The main arm 21*a* and the subsidiary arm 21*b* of the first elastic section 21 and the main arm 22*a* of the second elastic section 22 are positioned between the shoulder sections 17*a*, 18*a* and the subsidiary section 16*a*, whereby the main arm 21*a* of the first elastic section 21 is leant against the shoulder sections 17*a*, 18*a* (or the main arm 21*a* of the first elastic section 21 is leant against the first portion 14 (and/or the second portion 15)) and the main arm 22*a* of the second elastic section 22 is leant against the subsidiary section 16*a*. Also, the tail section 16*b* of the load arm 16 is positioned in the split 24 of the subsidiary bridge section 27 of the second elastic section 22 and the secondary arm 27*b* is positioned on the assembling section 19 (or the secondary arm 27*b* is secured to the case body 50 (or the assembling section of the case body 50)).

Accordingly, the load arm 16 at least passes through the main arm 21*a* and the subsidiary arm 21*b* of the first elastic section 21 and the main arm 22*a* of the second elastic section 22. Therefore, when the load arm 16 is (displaced) moved, in response to the (displacement) motion of the load arm 16, the first elastic section 21 is compressed, while the second elastic section 22 (and/or the subsidiary bridge section 27, the extension arm 27*a*, the secondary bridge section 27*c* and the secondary arm 27*b*) is tensioned.

When the load arm 16 (and/or the subsidiary section 16*a* and the tail section 16*b*) is restored or moved back, the first elastic section 21 releases the stored energy to provide tension (or pushback force), while the second elastic section 22 (and/or the subsidiary bridge section 27 and the secondary bridge section 27*c*) releases the stored energy to provide pulling force (or back pulling force). This helps in storing the first portion 14 and/or the second portion 15 to their initial states (or home positions without being forced).

It should be noted that in the condition that the manufacturing cost is not taken into consideration, the first elastic section 21 and the second elastic section 22 of the elastic unit 20 respectively provide pressure resistant action force and tensile action force. According to such system, the structures of the first elastic section 21 and the second elastic section 22 can be alternatively selectively made of different metal material (property). For example, the first elastic section 21 can be selectively made of a high-performance material with higher resistance against pressure (yield point) and the second elastic section 22 can be selectively made of a high-performance material with higher tensile strength (yield point).

To speak representatively, in comparison with the conventional terminal device, the conductive component structure of the rail-type terminal device of the present invention has the following advantages:

1. The conductive component 10 (and/or the elastic unit 20) and the relevant component structures have been redesigned. For example, the conductive component 10 includes a base section 10*a*, a first section 11, a second section 12, a first portion 14, a second portion 15 and an assembling section 19. The first section 11 and/or the second section 12 define a space 30 and are formed with an upper arm 17 and a lower arm 18 (and/or shoulder sections 17*a*, 18*a* and raised sections 17*b*, 18*b*). A load arm 16 and a subsidiary section 16*a* (and/or a tail section 16*b*) and the elastic unit 20 are received in the space 30. The elastic unit 20 includes a first elastic section 21, a second elastic section 22, main arms 21*a*, 22*a*, subsidiary arms 21*b*, 22*b*, bridge sections 21*c*, 22*c*, arcuate section 23 and a split 24 (and/or extension arm 27*a*, secondary bridge section 27*c* and secondary arm 27*b*) assembled with the load arm 16 to help in enhancing the elasticity (elastic force) of the first portion 14 and/or the second portion 15. The present invention is obviously different from the conventional terminal device in use and operation form. Also, the present invention changes the electro-conductive structure or assembling relationship of the conventional terminal device.
2. Especially, the load arm 16 of the conductive component 10 is assembled with the elastic unit 20. By means of the cooperative structures, when the conductive component 10 is (displaced) moved due to operation of an operator, the first and second elastic sections 21, 22 at the same time respectively have or provide two force systems of pressure resistant effect and tensile effect. This obviously prolongs the lifetime and effect of the elastic unit 20. Also, this improves the shortcoming of the conventional terminal device that in case single elastic action force is lost, the assistance of the elastic member in securely fastening the grounding member on the rail is deteriorated or reduced or it is necessary to selectively use special metal material (such as the high-performance material with higher resistance against pressure (yield point)) or simply increase the number of the elastic units so as to prolong the lifetime of the elastic unit. Relatively, a more stable and optimal elastic securing system is set up. Accordingly, in the case of improper operation and/or long-term (or highly frequent) use, the fastening and securing effect of the conductive component 10 to the rail in successive use will not be deteriorated so that the conductive effect of the conductive component 10 can be ensured.

In conclusion, the conductive component structure of the rail-type terminal device of the present invention is effective and different from the conventional terminal device in space form and is advantageous over the conventional terminal device. The conductive component structure of the rail-type terminal device of the present invention is greatly advanced and inventive.

The above embodiments are only used to illustrate the present invention, not intended to limit the scope thereof. Many modifications of the above embodiments can be made without departing from the spirit of the present invention.

What is claimed is:

1. A conductive component structure of rail-type terminal device, comprising a conductive component (10), the conductive component (10) having a base section (10*a*), a first section (11) and a second section (12) connected with the base section (10*a*) and extending to two lateral sides, the first section (11) and the second section (12) being respectively formed with a bow portion (13), a first portion (14) and a second portion (15) connected with the bow portion (13), at least one of the first and second sections (11, 12) defining a space (30) for receiving a load arm (16) and an elastic unit (20) assembled with the load arm (16), the load arm (16) having a subsidiary section (16*a*), the elastic unit (20) including a first elastic section (21) and a second elastic section (22), the load arm (16) passing through the first elastic section (21) and at least a part of the second elastic section (22), whereby when the load arm (16) is moved, in response to the motion of the load arm (16), the first elastic section (21) and the second elastic section (22) respectively provide tension effect and tensile effect.

2. The conductive component structure of rail-type terminal device as claimed in claim 1, wherein in an area in adjacency to the space (30), on the upper and lower sides of the load arm (16) being respectively disposed an upper arm (17), a shoulder section (17*a*) connected with the upper arm (17), a lower arm (18) and a shoulder section (18*a*) connected with the lower arm (18), the upper arm (17) and the lower arm (18) being respectively formed with raised sections (17*b*, 18*b*), the main arm (21*a*) of the first elastic section (21) being positioned between the shoulder sections (17*a*, 18*a*) and the raised sections (17*b*, 18*b*), whereby the main arm (21*a*) of the first elastic section (21) is leant against the shoulder sections (17*a*, 18*a*), the subsidiary arm (21*b*) of the first elastic section (21) and the main arm (22*a*) of the second elastic section (22) being positioned between the raised sections (17*b*, 18*b*) and the subsidiary section (16*a*), whereby the main arm (22*a*) of the second elastic section (22) is leant against the subsidiary section (16*a*), the subsidiary arm (22*b*) of the second elastic section (22) being positioned on the assembling section (19).

3. The conductive component structure of rail-type terminal device as claimed in claim 1, wherein in an area in adjacency to the space (30), on the upper and lower sides of the load arm (16) being respectively disposed an upper arm (17), a shoulder section (17*a*) connected with the upper arm (17), a lower arm (18) and a shoulder section (18*a*) connected with the lower arm (18), the upper arm (17) and the lower arm (18) being respectively formed with raised sections (17*b*, 18*b*), the main arm (21*a*) of the first elastic section (21) being positioned between at least one of the first and second portions (14, 15) and the raised sections (17*b*, 18*b*), whereby the main arm (21*a*) of the first elastic section (21) is leant against at least one of the first and second portions (14, 15), the subsidiary arm (21*b*) of the first elastic section (21) and the main arm (22*a*) of the second elastic section (22) being positioned between the raised sections (17*b*, 18*b*) and the subsidiary section (16*a*), whereby the main arm (22*a*) of the second elastic section (22) is leant against the subsidiary section (16*a*), the subsidiary arm (22*b*) of the second elastic section (22) being positioned on the assembling section (19).

4. The conductive component structure of rail-type terminal device as claimed in claim 1, wherein one end of the load arm (16) being connected with at least one of the first and second portions (14, 15), whereby at least a part of the load arm (16) and the subsidiary section (16*a*) are positioned in the space (30), the conductive component (10) being mounted in a case body (50) made of insulation material, the case body (50) being formed with a conductive module (55) for conductive wires to plug in and connect therewith, the base section (10*a*) of the conductive component (10) being assembled with the conductive module (55), the first and second portions (14, 15) of the conductive component (10) being respectively fastened with a grounding rail, the case body (50) being formed with a first assembling section (51)

and a second assembling section (52) respectively for assembling with a tail section (14*a*) of the first portion (14) and a tail section (15*a*) of the second portion (15), the case body (50) being formed with a chamber (53) for helping in receiving the elastic unit (20).

5. The conductive component structure of rail-type terminal device as claimed in claim 4, wherein in an area in adjacency to the space (30), on the upper and lower sides of the load arm (16) being respectively disposed an upper arm (17), a shoulder section (17*a*) connected with the upper arm (17), a lower arm (18) and a shoulder section (18*a*) connected with the lower arm (18), the upper arm (17) and the lower arm (18) being respectively formed with raised sections (17*b*, 18*b*), the main arm (21*a*) of the first elastic section (21) being positioned between the shoulder sections (17*a*, 18*a*) and the raised sections (17*b*, 18*b*), whereby the main arm (21*a*) of the first elastic section (21) is leant against the shoulder sections (17*a*, 18*a*), the subsidiary arm (21*b*) of the first elastic section (21) and the main arm (22*a*) of the second elastic section (22) being positioned between the raised sections (17*b*, 18*b*) and the subsidiary section (16*a*), whereby the main arm (22*a*) of the second elastic section (22) is leant against the subsidiary section (16*a*), the subsidiary arm (22*b*) of the second elastic section (22) being positioned on the assembling section (19).

6. The conductive component structure of rail-type terminal device as claimed in claim 4, wherein in an area in adjacency to the space (30), on the upper and lower sides of the load arm (16) being respectively disposed an upper arm (17), a shoulder section (17*a*) connected with the upper arm (17), a lower arm (18) and a shoulder section (18*a*) connected with the lower arm (18), the upper arm (17) and the lower arm (18) being respectively formed with raised sections (17*b*, 18*b*), the main arm (21*a*) of the first elastic section (21) being positioned between at least one of the first and second portions (14, 15) and the raised sections (17*b*, 18*b*), whereby the main arm (21*a*) of the first elastic section (21) is leant against at least one of the first and second portions (14, 15), the subsidiary arm (21*b*) of the first elastic section (21) and the main arm (22*a*) of the second elastic section (22) being positioned between the raised sections (17*b*, 18*b*) and the subsidiary section (16*a*), whereby the main arm (22*a*) of the second elastic section (22) is leant against the subsidiary section (16*a*), the subsidiary arm (22*b*) of the second elastic section (22) being positioned on the assembling section (19).

7. The conductive component structure of rail-type terminal device as claimed in claim 4, wherein the first elastic section (21) and the second elastic section (22) of the elastic unit (20) are a two-piece structure or integrally connected with each other to form a substantially M-shaped structure, an assembling section (19) in the form of perforation structure is disposed between the space (30) and the base section (10*a*), the first elastic section (21) and the second elastic section (22) respectively having main arms (21*a*, 22*a*) and subsidiary arms (21*b*, 22*b*) and bow-shaped bridge sections (21*c*, 22*c*) connected between the main arms (21*a*, 22*a*) and the subsidiary arms (21*b*, 22*b*), the subsidiary arm (21*b*) of the first elastic section (21) being attached to or connected with the main arm (22*a*) of the second elastic section (22), the main arm (21*a*) and the subsidiary arm (21*b*) of the first elastic section (21) and the main arm (22*a*) and the subsidiary arm (22*b*) of the second elastic section (22) being respectively formed with splits (24), which permit the load arm (16) to at least pass through the main arm (21*a*) and the subsidiary arm (21*b*) of the first elastic section (21) and the main arm (22*a*) of the second elastic section (22), when the load arm (16) is displaced and moved, in response to the displacement and motion of the load arm (16), the first elastic section (21) is compressed, while the second elastic section (22) is tensioned, when the load arm (16) is restored to its home position, the first elastic section (21) releases the stored energy to provide tension effect, while the second elastic section (22) releases the stored energy to provide pulling force effect.

8. The conductive component structure of rail-type terminal device as claimed in claim 7, wherein the main arm (21*a*) and the subsidiary arm (21*b*) of the first elastic section (21) and the main arm (22*a*) and the subsidiary arm (22*b*) of the second elastic section (22) are respectively formed with arcuate sections (23), the first elastic section (21) of the elastic unit (20) being a U-shaped structure, the split (24) extending along the main arm (21*a*) of the first elastic section (21) through the bridge section (21*c*) to the subsidiary arm (21*b*), the tail end of the main arm (21*a*) and the tail end of the subsidiary arm (21*b*) being respectively formed with closed section (25), the arcuate sections (23) of the main arm (21*a*) and the subsidiary arm (21*b*) of the first elastic section (21) being arced structures bent toward each other, while the arcuate sections (23) of the main arm (22*a*) and the subsidiary arm (22*b*) of the second elastic section (22) being arced structures bent away from each other, whereby the arcuate section (23) of the main arm (22*a*) of the second elastic section (22) is overlapped with and attached to the arcuate section (23) of the subsidiary arm (21*b*) of the first elastic section (21).

9. The conductive component structure of rail-type terminal device as claimed in claim 7, wherein the main arm (21*a*) and the subsidiary arm (21*b*) of the first elastic section (21) and the main arm (22*a*) and the subsidiary arm (22*b*) of the second elastic section (22) are respectively formed with arcuate sections (23), the first elastic section (21) of the elastic unit (20) being a U-shaped structure, the split (24) extending along the main arm (21*a*) of the first elastic section (21) through the bridge section (21*c*) to the subsidiary arm (21*b*), the tail end of the main arm (21*a*) and the tail end of the subsidiary arm (21*b*) being respectively formed with closed section (25), the arcuate sections (23) of the main arm (21*a*) and the subsidiary arm (21*b*) of the first elastic section (21) being arced structures bent toward each other, while the arcuate sections (23) of the main arm (22*a*) and the subsidiary arm (22*b*) of the second elastic section (22) being arced structures also bent toward each other, whereby the arcuate section (23) of the main arm (22*a*) of the second elastic section (22) and the arcuate section (23) of the subsidiary arm (21*b*) of the first elastic section (21) together define a void section (26).

10. The conductive component structure of rail-type terminal device as claimed in claim 7, wherein the elastic unit (20) has a bow-shaped subsidiary bridge section (27) formed between the subsidiary arm (21*b*) of the first elastic unit (21) and the main arm (22*a*) of the second elastic section (22), whereby the elastic unit (20) has the form of a waved structure, the subsidiary bridge section (27) being also formed with a split (24) connected with the split (24) of the subsidiary arm (21*b*) of the first elastic section (21) and the split (24) of the main arm (22*a*) of the second elastic section (22), the load arm (16) at least passing through the main arm (21*a*) and the subsidiary arm (21*b*) of the first elastic section (21) and the subsidiary bridge section (27) and the main arm (22*a*) of the second elastic section (22), whereby when the load arm (16) is moved, in response to the motion of the load arm (16), the first elastic section (21) and the subsidiary bridge section (27) are compressed, while the second elastic section (22) is tensioned, when the load arm (16) is restored to its home position, the first elastic section (21) and the subsidiary bridge section (27) releasing the stored energy to provide tension effect, while the second elastic section (22) releasing the stored energy to provide pulling force effect.

11. The conductive component structure of rail-type terminal device as claimed in claim 10, wherein in an area in adjacency to the space (30), on the upper and lower sides of the load arm (16) being respectively disposed an upper arm (17), a shoulder section (17*a*) connected with the upper arm (17), a lower arm (18) and a shoulder section (18*a*) connected with the lower arm (18), the upper arm (17) and the lower arm (18) being respectively formed with raised sections (17*b*, 18*b*), the main arm (21*a*) of the first elastic section (21) being positioned between the shoulder sections (17*a*, 18*a*) and the raised sections (17*b*, 18*b*), whereby the main arm (21*a*) of the first elastic section (21) is leant against the shoulder sections (17*a*, 18*a*), the subsidiary arm (21*b*) of the first elastic section (21), the subsidiary bridge section (27) and the main arm (22*a*) of the second elastic section (22) being positioned between the raised sections (17*b*, 18*b*) and the subsidiary section (16*a*), whereby the main arm (22*a*) of the second elastic section (22) is leant against the subsidiary section (16*a*), the subsidiary arm (22*b*) of the second elastic section (22) being positioned on the assembling section (19).

12. The conductive component structure of rail-type terminal device as claimed in claim 10, wherein in an area in adjacency to the space (30), on the upper and lower sides of the load arm (16) being respectively disposed an upper arm (17), a shoulder section (17*a*) connected with the upper arm (17), a lower arm (18) and a shoulder section (18*a*) connected with the lower arm (18), the upper arm (17) and the lower arm (18) being respectively formed with raised sections (17*b*, 18*b*), the main arm (21*a*) of the first elastic section (21) being positioned between at least one of the first and second portions (14, 15) and the raised sections (17*b*, 18*b*), whereby the main arm (21*a*) of the first elastic section (21) is leant against the at least one of the first and second portions (14, 15), the subsidiary arm (21*b*) of the first elastic section (21), the subsidiary bridge section (27) and the main arm (22*a*) of the second elastic section (22) being positioned between the raised sections (17*b*, 18*b*) and the subsidiary section (16*a*), whereby the main arm (22*a*) of the second elastic section (22) is leant against the subsidiary section (16*a*), the subsidiary arm (22*b*) of the second elastic section (22) being positioned on the assembling section (19).

13. The conductive component structure of rail-type terminal device as claimed in claim 7, wherein in an area in adjacency to the space (30), on the upper and lower sides of the load arm (16) being respectively disposed an upper arm (17), a shoulder section (17*a*) connected with the upper arm (17), a lower arm (18) and a shoulder section (18*a*) connected with the lower arm (18), the upper arm (17) and the lower arm (18) being respectively formed with raised sections (17*b*, 18*b*), the main arm (21*a*) of the first elastic section (21) being positioned between the shoulder sections (17*a*, 18*a*) and the raised sections (17*b*, 18*b*), whereby the main arm (21*a*) of the first elastic section (21) is leant against the shoulder sections (17*a*, 18*a*), the subsidiary arm (21*b*) of the first elastic section (21) and the main arm (22*a*) of the second elastic section (22) being positioned between the raised sections (17*b*, 18*b*) and the subsidiary section (16*a*), whereby the main arm (22*a*) of the second elastic section (22) is leant against the subsidiary section (16*a*), the subsidiary arm (22*b*) of the second elastic section (22) being positioned on the assembling section (19).

14. The conductive component structure of rail-type terminal device as claimed in claim 13, wherein the main arm (21*a*) and the subsidiary arm (21*b*) of the first elastic section (21) and the main arm (22*a*) and the subsidiary arm (22*b*) of the second elastic section (22) are respectively formed with arcuate sections (23), the first elastic section (21) of the elastic unit (20) being a U-shaped structure, the split (24) extending along the main arm (21*a*) of the first elastic section (21) through the bridge section (21*c*) to the subsidiary arm (21*b*), the tail end of the main arm (21*a*) and the tail end of the subsidiary arm (21*b*) being respectively formed with closed section (25), the arcuate sections (23) of the main arm (21*a*) and the subsidiary arm (21*b*) of the first elastic section (21) being arced structures bent toward each other, while the arcuate sections (23) of the main arm (22*a*) and the subsidiary arm (22*b*) of the second elastic section (22) being arced structures bent away from each other, whereby the arcuate section (23) of the main arm (22*a*) of the second elastic section (22) is overlapped with and attached to the arcuate section (23) of the subsidiary arm (21*b*) of the first elastic section (21).

15. The conductive component structure of rail-type terminal device as claimed in claim 13, wherein the elastic unit (20) has a bow-shaped subsidiary bridge section (27) formed between the subsidiary arm (21*b*) of the first elastic unit (21) and the main arm (22*a*) of the second elastic section (22), whereby the elastic unit (20) has the form of a waved structure, the subsidiary bridge section (27) being also formed with a split (24) connected with the split (24) of the subsidiary arm (21*b*) of the first elastic section (21) and the split (24) of the main arm (22*a*) of the second elastic section (22), the load arm (16) at least passing through the main arm (21*a*) and the subsidiary arm (21*b*) of the first elastic section (21) and the subsidiary bridge section (27) and the main arm (22*a*) of the second elastic section (22), whereby when the load arm (16) is moved, in response to the motion of the load arm (16), the first elastic section (21) and the subsidiary bridge section (27) are compressed, while the second elastic section (22) is tensioned, when the load arm (16) is restored to its home position, the first elastic section (21) and the subsidiary bridge section (27) releasing the stored energy to provide tension effect, while the second elastic section (22) releasing the stored energy to provide pulling force effect.

16. The conductive component structure of rail-type terminal device as claimed in claim 15, wherein in an area in adjacency to the space (30), on the upper and lower sides of the load arm (16) being respectively disposed an upper arm (17), a shoulder section (17*a*) connected with the upper arm (17), a lower arm (18) and a shoulder section (18*a*) connected with the lower arm (18), the upper arm (17) and the lower arm (18) being respectively formed with raised sections (17*b*, 18*b*), the main arm (21*a*) of the first elastic section (21) being positioned between the shoulder sections (17*a*, 18*a*) and the raised sections (17*b*, 18*b*), whereby the main arm (21*a*) of the first elastic section (21) is leant against the shoulder sections (17*a*, 18*a*), the subsidiary arm (21*b*) of the first elastic section (21), the subsidiary bridge section (27) and the main arm (22*a*) of the second elastic section (22) being positioned between the raised sections (17*b*, 18*b*) and the subsidiary section (16*a*), whereby the main arm (22*a*) of the second elastic section (22) is leant against the subsidiary section (16*a*), the subsidiary arm (22*b*) of the second elastic section (22) being positioned on the assembling section (19).

17. The conductive component structure of rail-type terminal device as claimed in claim 15, wherein in an area in adjacency to the space (30), on the upper and lower sides of the load arm (16) being respectively disposed an upper arm (17), a shoulder section (17*a*) connected with the upper arm (17), a lower arm (18) and a shoulder section (18*a*) connected with the lower arm (18), the upper arm (17) and the lower arm (18) being respectively formed with raised sections (17*b*, 18*b*), the main arm (21*a*) of the first elastic section (21) being positioned between at least one of the first and second portions (14, 15) and the raised sections (17*b*, 18*b*), whereby the main arm (21*a*) of the first elastic section (21) is leant against the at least one of the first and second portions (14, 15), the subsidiary arm (21*b*) of the first elastic section (21), the subsidiary bridge section(27) and the main arm (22*a*) of the second elastic section (22) being positioned between the raised sections (17*b*, 18*b*) and the subsidiary section (16*a*), whereby the main arm (22*a*) of the second elastic section (22) is leant against the subsidiary section (16*a*), the subsidiary arm (22*b*) of the second elastic section (22) being positioned on the assembling section (19).

18. The conductive component structure of rail-type terminal device as claimed in claim 7, wherein in an area in adjacency to the space (30), on the upper and lower sides of the load arm (16) being respectively disposed an upper arm (17), a shoulder section (17*a*) connected with the upper arm (17), a lower arm (18) and a shoulder section (18*a*) connected with the lower arm (18), the upper arm (17) and the lower arm (18) being respectively formed with raised sections (17*b*, 18*b*), the main arm (21*a*) of the first elastic section (21) being positioned between at least one of the first and second portions (14, 15) and the raised sections (17*b*, 18*b*), whereby the main arm (21*a*) of the first elastic section (21) is leant against at least one of the first and second portions (14, 15), the subsidiary arm (21*b*) of the first elastic section (21) and the main arm (22*a*) of the second elastic section (22) being positioned between the raised sections (17*b*, 18*b*) and the subsidiary section (16*a*), whereby the main arm (22*a*) of the second elastic section (22) is leant against the subsidiary section (16*a*), the subsidiary arm (22*b*) of the second elastic section (22) being positioned on the assembling section (19).

19. The conductive component structure of rail-type terminal device as claimed in claim 18, wherein the main arm (21*a*) and the subsidiary arm (21*b*) of the first elastic section (21) and the main arm (22*a*) and the subsidiary arm (22*b*) of the second elastic section (22) are respectively formed with arcuate sections (23), the first elastic section (21) of the elastic unit (20) being a U-shaped structure, the split (24) extending along the main arm (21*a*) of the first elastic section (21) through the bridge section (21*c*) to the subsidiary arm (21*b*), the tail end of the main arm (21*a*) and the tail end of the subsidiary arm (21*b*) being respectively formed with closed section (25), the arcuate sections (23) of the main arm (21*a*) and the subsidiary arm (21*b*) of the first elastic section (21) being arced structures bent toward each other, while the arcuate sections (23) of the main arm (22*a*) and the subsidiary arm (22*b*) of the second elastic section (22) being arced structures bent away from each other, whereby the arcuate section (23) of the main arm (22*a*) of the second elastic section (22) is overlapped with and attached to the arcuate section (23) of the subsidiary arm (21*b*) of the first elastic section (21).

20. The conductive component structure of rail-type terminal device as claimed in claim 18, wherein the elastic unit (20) has a bow-shaped subsidiary bridge section (27) formed between the subsidiary arm (21*b*) of the first elastic unit (21) and the main arm (22*a*) of the second elastic section (22), whereby the elastic unit (20) has the form of a waved structure, the subsidiary bridge section (27) being also formed with a split (24) connected with the split (24) of the subsidiary arm (21*b*) of the first elastic section (21) and the split (24) of the main arm (22*a*) of the second elastic section (22), the load arm (16) at least passing through the main arm (21*a*) and the subsidiary arm (21*b*) of the first elastic section (21) and the subsidiary bridge section (27) and the main arm (22*a*) of the second elastic section (22), whereby when the load arm (16) is moved, in response to the motion of the load arm (16), the first elastic section (21) and the subsidiary bridge section (27) are compressed, while the second elastic section (22) is tensioned, when the load arm (16) is restored to its home position, the first elastic section (21) and the subsidiary bridge section (27) releasing the stored energy to provide tension effect, while the second elastic section (22) releasing the stored energy to provide pulling force effect.

21. The conductive component structure of rail-type terminal device as claimed in claim 20, wherein in an area in adjacency to the space (30), on the upper and lower sides of the load arm (16) being respectively disposed an upper arm (17), a shoulder section (17*a*) connected with the upper arm (17), a lower arm (18) and a shoulder section 18*a* connected with the lower arm (18), the upper arm (17) and the lower arm (18) being respectively formed with raised sections (17*b*, 18*b*), the main arm (21*a*) of the first elastic section (21) being positioned between the shoulder sections (17*a*, 18*a*) and the raised sections (17*b*, 18*b*), whereby the main arm (21*a*) of the first elastic section (21) is leant against the shoulder sections (17*a*, 18*a*), the subsidiary arm (21*b*) of the first elastic section (21), the subsidiary bridge section (27) and the main arm (22*a*) of the second elastic section (22) being positioned between the raised sections (17*b*, 18*b*) and the subsidiary section (16*a*), whereby the main arm (22*a*) of the second elastic section (22) is leant against the subsidiary section (16*a*), the subsidiary arm (22*b*) of the second elastic section (22) being positioned on the assembling section (19).

22. The conductive component structure of rail-type terminal device as claimed in claim 20, wherein in an area in adjacency to the space (30), on the upper and lower sides of the load arm (16) being respectively disposed an upper arm (17), a shoulder section (17*a*) connected with the upper arm (17), a lower arm (18) and a shoulder section (18*a*) connected with the lower arm (18), the upper arm (17) and the lower arm (18) being respectively formed with raised sections (17*b*, 18*b*), the main arm (21*a*) of the first elastic section (21) being positioned between at least one of the first and second portions (14, 15) and the raised sections (17*b*, 18*b*), whereby the main arm (21*a*) of the first elastic section (21) is leant against at least one of the first and second portions (14, 15), the subsidiary arm (21*b*) of the first elastic section (21), the subsidiary bridge section (27) and the main arm (22*a*) of the second elastic section (22) being positioned between the raised sections (17*b*, 18*b*) and the subsidiary section (16*a*), whereby the main arm (22*a*) of the second elastic section (22) is leant against the subsidiary section (16*a*), the subsidiary arm (22*b*) of the second elastic section (22) being positioned on the assembling section (19).

23. The conductive component structure of rail-type terminal device as claimed in claim 1, wherein the first elastic section (21) and the second elastic section (22) of the elastic unit (20) are a two-piece structure or integrally connected with each other to form a substantially M-shaped structure, an assembling section (19) in the form of perforation structure is disposed between the space (30) and the base section (10*a*), the first elastic section (21) and the second elastic section (22) respectively having main arms (21*a*, 22*a*) and subsidiary arms (21*b*, 22*b*) and bow-shaped bridge sections (21*c*, 22*c*) connected between the main arms (21*a*, 22*a*) and the subsidiary arms (21*b*, 22*b*), the subsidiary arm (21*b*) of the first elastic section (21) being attached to or connected with the main arm (22*a*) of the second elastic section (22), the main arm (21*a*) and the subsidiary arm (21*b*) of the first elastic section (21) and the main arm (22*a*) and the subsidiary arm (22*b*) of the second elastic section (22) being respectively formed with splits (24), which permit the load arm (16) to at least pass through the main arm (21*a*) and the subsidiary arm (21*b*) of the first elastic section (21) and the main arm (22*a*) of the second elastic section (22), when the load arm (16) is displaced and moved, in response to the displacement and motion of the load arm (16), the first elastic section (21) is compressed, while the second elastic section (22) is tensioned, when the load arm (16) is restored to its home position, the first elastic section (21) releases the stored energy to provide tension effect, while the second elastic section (22) releases the stored energy to provide pulling force effect.

24. The conductive component structure of rail-type terminal device as claimed in claim 23, wherein the main arm (21*a*) and the subsidiary arm (21*b*) of the first elastic section (21) and the main arm (22*a*) and the subsidiary arm (22*b*) of the second elastic section (22) are respectively formed with arcuate sections (23), the first elastic section (21) of the elastic unit (20) being a U-shaped structure, the split (24) extending along the main arm (21*a*) of the first elastic section (21) through the bridge section (21*c*) to the subsidiary arm (21*b*), the tail end of the main arm (21*a*) and the tail end of the subsidiary arm (21*b*) being respectively formed with closed section (25), the arcuate sections (23) of the main arm (21*a*) and the subsidiary arm (21*b*) of the first elastic section (21) being arced structures bent toward each other, while the arcuate sections (23) of the main arm (22*a*) and the subsidiary arm (22*b*) of the second elastic section (22) being arced structures bent away from each other, whereby the arcuate section (23) of the main arm (22*a*) of the second elastic section (22) is overlapped with and attached to the arcuate section (23) of the subsidiary arm (21*b*) of the first elastic section (21).

25. The conductive component structure of rail-type terminal device as claimed in claim 23, wherein the main arm (21*a*) and the subsidiary arm (21*b*) of the first elastic section (21) and the main arm (22*a*) and the subsidiary arm (22*b*) of the second elastic section (22) are respectively formed with arcuate sections (23), the first elastic section (21) of the elastic unit (20) being a U-shaped structure, the split (24) extending along the main arm (21*a*) of the first elastic section (21) through the bridge section (21*c*) to the subsidiary arm (21*b*), the tail end of the main arm (21*a*) and the tail end of the subsidiary arm (21*b*) being respectively formed with closed section (25), the arcuate sections (23) of the main arm (21*a*) and the subsidiary arm (21*b*) of the first elastic section (21) being arced structures bent toward each other, while the arcuate sections (23) of the main arm (22*a*) and the subsidiary arm (22*b*) of the second elastic section (22) being arced structures also bent toward each other, whereby the arcuate section (23) of the main arm (22*a*) of the second elastic section (22) and the arcuate section (23) of the subsidiary arm (21*b*) of the first elastic section (21) together define a void section (26).

26. The conductive component structure of rail-type terminal device as claimed in claim 23, wherein the elastic unit (20) has a bow-shaped subsidiary bridge section (27) formed between the subsidiary arm (21*b*) of the first elastic unit (21) and the main arm (22*a*) of the second elastic section (22), whereby the elastic unit (20) has the form of a waved structure, the subsidiary bridge section (27) being also formed with a split (24) connected with the split (24) of the subsidiary arm (21*b*) of the first elastic section (21) and the split (24) of the main arm (22*a*) of the second elastic section (22), the load arm (16) at least passing through the main arm (21*a*) and the subsidiary arm (21*b*) of the first elastic section (21) and the subsidiary bridge section (27) and the main arm (22*a*) of the second elastic section (22), whereby when the load arm (16) is moved, in response to the motion of the load arm (16), the first elastic section (21) and the subsidiary bridge section (27) are compressed, while the second elastic section (22) is tensioned, when the load arm (16) is restored to its home position, the first elastic section (21) and the subsidiary bridge section (27) releasing the stored energy to provide tension effect, while the second elastic section (22) releasing the stored energy to provide pulling force effect.

27. The conductive component structure of rail-type terminal device as claimed in claim 26, wherein in an area in adjacency to the space (30), on the upper and lower sides of the load arm (16) being respectively disposed an upper arm (17), a shoulder section (17*a*) connected with the upper arm (17), a lower arm (18) and a shoulder section (18*a*) connected with the lower arm (18), the upper arm (17) and the lower arm (18) being respectively formed with raised sections (17*b*, 18*b*), the main arm (21*a*) of the first elastic section (21) being positioned between the shoulder sections (17*a*, 18*a*) and the raised sections (17*b*, 18*b*), whereby the main arm (21*a*) of the first elastic section (21) is leant against the shoulder sections (17*a*, 18*a*), the subsidiary arm (21*b*) of the first elastic section (21), the subsidiary bridge section (27) and the main arm (22*a*) of the second elastic section (22) being positioned between the raised sections (17*b*, 18*b*) and the subsidiary section (16*a*), whereby the main arm (22*a*) of the second elastic section (22) is leant against the subsidiary section (16*a*), the subsidiary arm (22*b*) of the second elastic section (22) being positioned on the assembling section (19).

28. The conductive component structure of rail-type terminal device as claimed in claim 26, wherein in an area in adjacency to the space (30), on the upper and lower sides of the load arm (16) being respectively disposed an upper arm (17), a shoulder section (17*a*) connected with the upper arm (17), a lower arm (18) and a shoulder section (18*a*) connected with the lower arm (18), the upper arm (17) and the lower arm (18) being respectively formed with raised sections (17*b*, 18*b*), the main arm (21*a*) of the first elastic section (21) being positioned between at least one of the first and second portions (14, 15) and the raised sections (17*b*, 18*b*), whereby the main arm (21*a*) of the first elastic section (21) is leant against the at least one of the first and second portions (14, 15), the subsidiary arm (21*b*) of the first elastic section (21), the subsidiary bridge section (27) and the main arm (22*a*) of the second elastic section (22) being positioned between the raised sections (17*b*, 18*b*) and the subsidiary section (16*a*), whereby the main arm (22*a*) of the second elastic section (22) is leant against the subsidiary section (16*a*), the subsidiary arm (22*b*) of the second elastic section (22) being positioned on the assembling section (19).

29. The conductive component structure of rail-type terminal device as claimed in claim 23, wherein at least one of the subsidiary arm (22*b*) of the second elastic section (22) and the subsidiary arm (21*b*) of the first elastic section (21) is connected with a bow-shaped subsidiary bridge section (27), the subsidiary bridge section (27) being connected with an extension arm (27*a*), the extension arm (27*a*) being connected with a bow-shaped secondary bridge section (27*c*), the secondary bridge section (27*c*) being connected with a secondary arm (27*b*), whereby at least one of the second elastic section (22) and the first elastic section (21) has the form of a waved structure, the subsidiary bridge section (27), the extension arm (27*a*) and the secondary arm (27*b*) being formed with a split (24), the subsidiary section (16*a*) of the load arm (16) being connected with a tail section (16*b*).

30. The conductive component structure of rail-type terminal device as claimed in claim 29, wherein in an area in adjacency to the space (30), on the upper and lower sides of the load arm (16) being respectively disposed an upper arm (17), a shoulder section (17*a*) connected with the upper arm (17), a lower arm (18) and a shoulder section (18*a*) connected with the lower arm (18), the main arm (21*a*) and the subsidiary arm (21*b*) of the first elastic section (21) and the main arm (22*a*) of the second elastic section (22) being positioned between the shoulder sections (17*a*), (18*a*) and the subsidiary section (16*a*), whereby the main arm (21*a*) of the first elastic section (21) is leant against the shoulder sections (17*a*, 18*a*) and the main arm (22*a*) of the second elastic section (22) is leant against the subsidiary section (16*a*), the tail section (16*b*) of the load arm (16) being positioned in the split (24) of the subsidiary bridge section (27) of the second elastic section (22) and the secondary arm (27*b*) being positioned on the assembling section (19), whereby when the load arm (16) is moved, in response to the motion of the load arm (16), the first elastic section (21) is compressed, while the second elastic section (22), the subsidiary bridge section (27), the extension arm (27*a*), the secondary bridge section (27*c*) and the secondary arm (27*b*) are tensioned, when the load arm (16) is restored to its home position, the first elastic section (21) releases the stored energy to provide tension effect, while the second elastic section (22), the subsidiary bridge section (27) and the secondary bridge section (27*c*) release the stored energy to provide pulling force effect.

31. The conductive component structure of rail-type terminal device as claimed in claim 29, wherein in an area in adjacency to the space (30), on the upper and lower sides of the load arm (16) being respectively disposed an upper arm (17), a shoulder section (17*a*) connected with the upper arm (17), a lower arm (18) and a shoulder section 18*a* connected with the lower arm (18), the main arm (21*a*) and the subsidiary arm (21*b*) of the first elastic section (21) and the main arm (22*a*) of the second elastic section (22) being positioned between at least one of the first and second portions (14, 15) and the subsidiary section (16*a*), whereby the main arm (21*a*) of the first elastic section (21) is leant against at least one of the first and second portions (14, 15) and the main arm (22*a*) of the second elastic section (22) is leant against the subsidiary section (16*a*), the tail section (16*b*) of the load arm (16) being positioned in the split (24) of the subsidiary bridge section (27) of the second elastic section (22) and the secondary arm (27*b*) being positioned on the assembling section (19), whereby when the load arm (16) is moved, in response to the motion of the load arm (16), the first elastic section (21) is compressed, while the second elastic section (22), the subsidiary bridge section (27), the extension arm (27*a*), the secondary bridge section (27*c*) and the secondary arm (27*b*) are tensioned, when the load arm (16) is restored to its home position, the first elastic section (21) releases the stored energy to provide tension effect, while the second elastic section (22), the subsidiary bridge section (27) and the secondary bridge section (27*c*) release the stored energy to provide pulling force effect.

32. The conductive component structure of rail-type terminal device as claimed in claim 23, wherein in an area in adjacency to the space (30), on the upper and lower sides of the load arm (16) being respectively disposed an upper arm (17), a shoulder section (17*a*) connected with the upper arm (17), a lower arm (18) and a shoulder section (18*a*) connected with the lower arm (18), the upper arm (17) and the lower arm (18) being respectively formed with raised sections (17*b*, 18*b*), the main arm (21*a*) of the first elastic section (21) being positioned between the shoulder sections (17*a*, 18*a*) and the raised sections (17*b*, 18*b*), whereby the main arm (21*a*) of the first elastic section (21) is leant against the shoulder sections (17*a*, 18*a*), the subsidiary arm (21*b*) of the first elastic section (21) and the main arm (22*a*) of the second elastic section (22) being positioned between the raised sections (17*b*, 18*b*) and the subsidiary section (16*a*), whereby the main arm (22*a*) of the second elastic section (22) is leant against the subsidiary section (16*a*), the subsidiary arm (22*b*) of the second elastic section (22) being positioned on the assembling section (19).

33. The conductive component structure of rail-type terminal device as claimed in claim 32, wherein the main arm (21*a*) and the subsidiary arm (21*b*) of the first elastic section (21) and the main arm (22*a*) and the subsidiary arm (22*b*) of the second elastic section (22) are respectively formed with arcuate sections (23), the first elastic section (21) of the elastic unit (20) being a U-shaped structure, the split (24) extending along the main arm (21*a*) of the first elastic section (21) through the bridge section (21*c*) to the subsidiary arm (21*b*), the tail end of the main arm (21*a*) and the tail end of the subsidiary arm (21*b*) being respectively formed with closed section (25), the arcuate sections (23) of the main arm (21*a*) and the subsidiary arm (21*b*) of the first elastic section (21) being arced structures bent toward each other, while the arcuate sections (23) of the main arm (22*a*) and the subsidiary arm (22*b*) of the second elastic section (22) being arced structures bent away from each other, whereby the arcuate section (23) of the main arm (22*a*) of the second elastic section (22) is overlapped with and attached to the arcuate section (23) of the subsidiary arm (21*b*) of the first elastic section (21).

34. The conductive component structure of rail-type terminal device as claimed in claim 32, wherein the elastic unit (20) has a bow-shaped subsidiary bridge section (27) formed between the subsidiary arm (21*b*) of the first elastic unit (21) and the main arm (22*a*) of the second elastic section (22), whereby the elastic unit (20) has the form of a waved structure, the subsidiary bridge section (27) being also formed with a split (24) connected with the split (24) of the subsidiary arm (21*b*) of the first elastic section (21) and the split (24) of the main arm (22*a*) of the second elastic section (22), the load arm (16) at least passing through the main arm (21*a*) and the subsidiary arm (21*b*) of the first elastic section (21) and the subsidiary bridge section (27) and the main arm (22*a*) of the second elastic section (22), whereby when the load arm (16) is moved, in response to the motion of the load arm (16), the first elastic section (21) and the subsidiary bridge section (27) are compressed, while the second elastic section (22) is tensioned, when the load arm (16) is restored to its home position, the first elastic section (21) and the subsidiary bridge section (27) releasing the stored energy to provide tension effect, while the second elastic section (22) releasing the stored energy to provide pulling force effect.

35. The conductive component structure of rail-type terminal device as claimed in claim 34, wherein in an area in adjacency to the space (30), on the upper and lower sides of the load arm (16) being respectively disposed an upper arm (17), a shoulder section (17*a*) connected with the upper arm (17), a lower arm (18) and a shoulder section (18*a*) connected with the lower arm (18), the upper arm (17) and the lower arm (18) being respectively formed with raised sections (17*b*, 18*b*), the main arm (21*a*) of the first elastic section (21) being positioned between the shoulder sections (17*a*, 18*a*) and the raised sections (17*b*, 18*b*), whereby the main arm (21*a*) of the first elastic section (21) is leant against the shoulder sections (17*a*, 18*a*), the subsidiary arm (21*b*) of the first elastic section (21), the subsidiary bridge section (27) and the main arm (22*a*) of the second elastic section (22) being positioned between the raised sections (17*b*, 18*b*) and the subsidiary section (16*a*), whereby the main arm (22*a*) of the second elastic section (22) is leant against the subsidiary section (16*a*), the subsidiary arm (22*b*) of the second elastic section (22) being positioned on the assembling section (19).

36. The conductive component structure of rail-type terminal device as claimed in claim 34, wherein in an area in adjacency to the space (30), on the upper and lower sides of the load arm (16) being respectively disposed an upper arm (17), a shoulder section (17*a*) connected with the upper arm (17), a lower arm (18) and a shoulder section (18*a*) connected with the lower arm (18), the upper arm (17) and the lower arm (18) being respectively formed with raised sections (17*b*, 18*b*), the main arm (21*a*) of the first elastic section (21) being positioned between at least one of the first and second portions (14, 15) and the raised sections (17*b*, 18*b*), whereby the main arm (21*a*) of the first elastic section (21) is leant against the at least one of the first and second portions (14, 15), the subsidiary arm (21*b*) of the first elastic section (21), the subsidiary bridge section(27) and the main arm (22*a*) of the second elastic section (22) being positioned between the raised sections (17*b*, 18*b*) and the subsidiary section (16*a*), whereby the main arm (22*a*) of the second elastic section (22) is leant against the subsidiary section (16*a*), the subsidiary arm (22*b*) of the second elastic section (22) being positioned on the assembling section (19).

37. The conductive component structure of rail-type terminal device as claimed in claim 23, wherein in an area in adjacency to the space (30), on the upper and lower sides of the load arm (16) being respectively disposed an upper arm (17), a shoulder section (17*a*) connected with the upper arm (17), a lower arm (18) and a shoulder section (18*a*) connected with the lower arm (18), the upper arm (17) and the lower arm (18) being respectively formed with raised sections (17*b*, 18*b*), the main arm (21*a*) of the first elastic section (21) being positioned between at least one of the first and second portions (14, 15) and the raised sections (17*b*, 18*b*), whereby the main arm (21*a*) of the first elastic section (21) is leant against at least one of the first and second portions (14, 15), the subsidiary arm (21*b*) of the first elastic section (21) and the main arm (22*a*) of the second elastic section (22) being positioned between the raised sections (17*b*, 18*b*) and the subsidiary section (16*a*), whereby the main arm (22*a*) of the second elastic section (22) is leant against the subsidiary section (16*a*), the subsidiary arm (22*b*) of the second elastic section (22) being positioned on the assembling section (19).

38. The conductive component structure of rail-type terminal device as claimed in claim 37, wherein the main arm (21*a*) and the subsidiary arm (21*b*) of the first elastic section (21) and the main arm (22*a*) and the subsidiary arm (22*b*) of the second elastic section (22) are respectively formed with arcuate sections (23), the first elastic section (21) of the elastic unit (20) being a U-shaped structure, the split (24) extending along the main arm (21*a*) of the first elastic section (21) through the bridge section (21*c*) to the subsidiary arm (21*b*), the tail end of the main arm (21*a*) and the tail end of the subsidiary arm (21*b*) being respectively formed with closed section (25), the arcuate sections (23) of the main arm (21*a*) and the subsidiary arm (21*b*) of the first elastic section (21) being arced structures bent toward each other, while the arcuate sections (23) of the main arm (22*a*) and the subsidiary arm (22*b*) of the second elastic section (22) being arced structures bent away from each other, whereby the arcuate section (23) of the main arm (22*a*) of the second elastic section (22) is overlapped with and attached to the arcuate section (23) of the subsidiary arm (21*b*) of the first elastic section (21).

39. The conductive component structure of rail-type terminal device as claimed in claim 37, wherein the elastic unit (20) has a bow-shaped subsidiary bridge section (27) formed between the subsidiary arm (21*b*) of the first elastic unit (21) and the main arm (22*a*) of the second elastic section (22), whereby the elastic unit (20) has the form of a waved structure, the subsidiary bridge section (27) being also formed with a split (24) connected with the split (24) of the subsidiary arm (21*b*) of the first elastic section (21) and the split (24) of the main arm (22*a*) of the second elastic section (22), the load arm (16) at least passing through the main arm (21*a*) and the subsidiary arm (21*b*) of the first elastic section (21) and the subsidiary bridge section (27) and the main arm (22*a*) of the second elastic section (22), whereby when the load arm (16) is moved, in response to the motion of the load arm (16), the first elastic section (21) and the subsidiary bridge section (27) are compressed, while the second elastic section (22) is tensioned, when the load arm (16) is restored to its home position, the first elastic section (21) and the subsidiary bridge section (27) releasing the stored energy to provide tension effect, while the second elastic section (22) releasing the stored energy to provide pulling force effect.

40. The conductive component structure of rail-type terminal device as claimed in claim 39, wherein in an area in adjacency to the space (30), on the upper and lower sides of the load arm (16) being respectively disposed an upper arm (17), a shoulder section (17*a*) connected with the upper arm (17), a lower arm (18) and a shoulder section 18*a* connected with the lower arm (18), the upper arm (17) and the lower arm (18) being respectively formed with raised sections (17*b*, 18*b*), the main arm (21*a*) of the first elastic section (21) being positioned between the shoulder sections (17*a*, 18*a*) and the raised sections (17*b*, 18*b*), whereby the main arm (21*a*) of the first elastic section (21) is leant against the shoulder sections (17*a*, 18*a*), the subsidiary arm (21*b*) of the first elastic section (21), the subsidiary bridge section (27) and the main arm (22*a*) of the second elastic section (22) being positioned between the raised sections (17*b*, 18*b*) and the subsidiary section (16*a*), whereby the main arm (22*a*) of the second elastic section (22) is leant against the subsidiary section (16*a*), the subsidiary arm (22*b*) of the second elastic section (22) being positioned on the assembling section (19).

41. The conductive component structure of rail-type terminal device as claimed in claim 39, wherein in an area in adjacency to the space (30), on the upper and lower sides of the load arm (16) being respectively disposed an upper arm (17), a shoulder section (17*a*) connected with the upper arm (17), a lower arm (18) and a shoulder section (18*a*) connected with the lower arm (18), the upper arm (17) and the lower arm (18) being respectively formed with raised sections (17*b*, 18*b*), the main arm (21*a*) of the first elastic section (21) being positioned between at least one of the first and second portions (14, 15) and the raised sections (17*b*, 18*b*), whereby the main arm (21*a*) of the first elastic section (21) is leant against at least one of the first and second portions (14, 15), the subsidiary arm (21*b*) of the first elastic section (21), the subsidiary bridge section (27) and the main arm (22*a*) of the second elastic section (22) being positioned between the raised sections (17*b*, 18*b*) and the subsidiary section (16*a*), whereby the main arm (22*a*) of the second elastic section (22) is leant against the subsidiary section (16*a*), the subsidiary arm (22*b*) of the second elastic section (22) being positioned on the assembling section (19).

* * * * *